United States Patent [19]

Lewen et al.

[11] Patent Number: 5,341,374
[45] Date of Patent: Aug. 23, 1994

[54] COMMUNICATION NETWORK INTEGRATING VOICE DATA AND VIDEO WITH DISTRIBUTED CALL PROCESSING

[75] Inventors: Ronald C. Lewen, Sycamore; Jonathan V. Coyle, Downers Grove; Peter P. Marotta, Oak Park; Tauras J. Liubinskas, Westmont; David P. Arnold, St. Charles; Kenneth R. Byers, Aurora; Anthony K. Dean, Elgin; Victor A. Nowakowski, North Aurora, all of Ill.

[73] Assignee: TriLAN Systems Corporation, St. Charles, Ill.

[21] Appl. No.: 663,369

[22] Filed: Mar. 1, 1991

[51] Int. Cl.$^5$ ............................................. H04J 3/02
[52] U.S. Cl. ................................. 370/85.4; 370/32.1; 370/62; 379/202
[58] Field of Search ............... 370/85.4, 85.5, 85.6, 370/85.14, 85.15, 60, 94.1, 62, 32.1; 340/825.05, 825.5, 825.51, 825.52; 379/202

[56] References Cited

U.S. PATENT DOCUMENTS

| | | | |
|---|---|---|---|
| 4,321,703 | 3/1982 | Schwaertzel et al. | 370/85.7 |
| 4,404,557 | 9/1983 | Grow | 370/85.5 |
| 4,539,679 | 9/1985 | Bux et al. | 370/85.14 |
| 4,549,291 | 10/1985 | Renoulin et al. | 370/85.5 |
| 4,566,097 | 1/1986 | Bederman | 370/85.5 |
| 4,567,590 | 1/1986 | Bederman | 370/85.15 |
| 4,587,651 | 5/1986 | Nelson et al. | 370/85.12 |
| 4,587,652 | 5/1986 | Goldman | 370/110.1 |
| 4,621,362 | 11/1986 | Sy | 370/85.14 |
| 4,630,262 | 12/1986 | Callens et al. | 370/94.1 |
| 4,644,468 | 2/1987 | Doster et al. | 395/200 |
| 4,644,470 | 2/1987 | Feigenbaum et al. | 395/200 |
| 4,663,758 | 5/1987 | Lambarelli et al. | 370/85.1 |
| 4,667,322 | 5/1987 | Ulug | 370/85.4 |
| 4,701,630 | 10/1987 | Annunziata et al. | 370/85.1 |
| 4,718,005 | 1/1988 | Feigenbaum et al. | 395/200 |
| 4,726,018 | 2/1988 | Bux et al. | 370/85.5 |
| 4,731,784 | 3/1988 | Keller et al. | 370/85.5 |
| 4,757,497 | 7/1988 | Beierle et al. | 370/85.12 |
| 4,763,321 | 8/1988 | Calvignac et al. | 370/29 |
| 4,771,391 | 9/1988 | Blasbalg | 370/85.2 |
| 4,792,945 | 12/1988 | Mark | 340/825.05 |
| 4,843,606 | 6/1989 | Bux et al. | 370/85.4 |
| 4,866,704 | 9/1989 | Bergman | 370/85.4 |
| 4,881,074 | 11/1989 | Reichbauer et al. | 370/85.15 |
| 4,897,841 | 1/1990 | Gang, Jr. | 370/85.13 |
| 4,905,230 | 2/1990 | Madge et al. | 370/85.5 |
| 5,070,501 | 12/1991 | Shimizu | 340/825.05 |
| 5,086,426 | 2/1992 | Tsukakoshi et al. | 370/85.14 |
| 5,113,392 | 5/1992 | Takiyasu et al. | 370/94.1 |

Primary Examiner—Douglas W. Olms
Assistant Examiner—Ajit Patel
Attorney, Agent, or Firm—Emrich & Dithmar

[57] ABSTRACT

A token ring local area network integrates voice, data and image information over a single cable with voice packets having a higher priority than non-voice packets, and with all the voice packets having the same length and the maximum non-voice packet length being related to the voice packet length and to the maximum number of terminals in the network so as to ensure real-time voice reception. Call processing functions are fully distributed among the voice terminals without the use of a centralized processing unit or a centralized data base. Conference calls are effected by each party transmitting conference packets to a single destination party, with conference packets having a unique packet format wherein a single packet incorporates voice information from plural terminals so as to minimize the number of packets traversing the ring. The token ring includes a plurality of interconnected stations or node coupling units, each of which is, in turn, connected to a plurality of nodes or terminals in a star-wired configuration, with each terminal having connected thereto one or more application devices, such as a digital feature telephone, a video camera, or a PC. One or more of the node coupling units may be connected to a bridge for providing connection to another token ring, or to a gateway for providing connection to external networks, such as a PBX, a telephone central office, or a host computer.

40 Claims, 15 Drawing Sheets

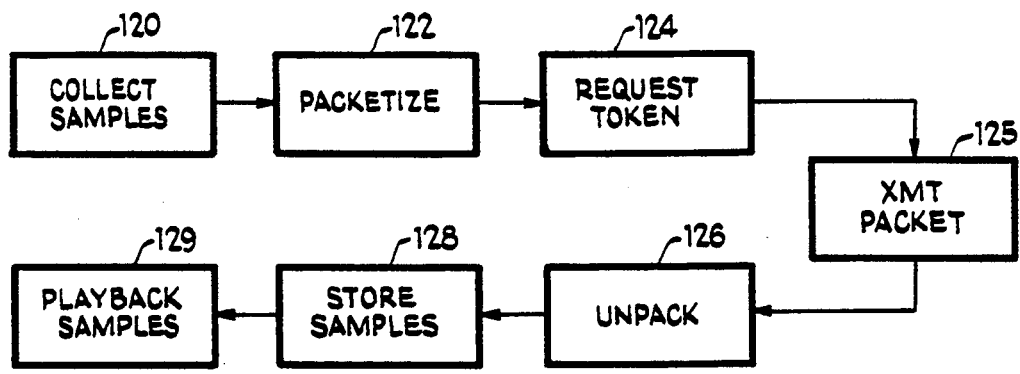
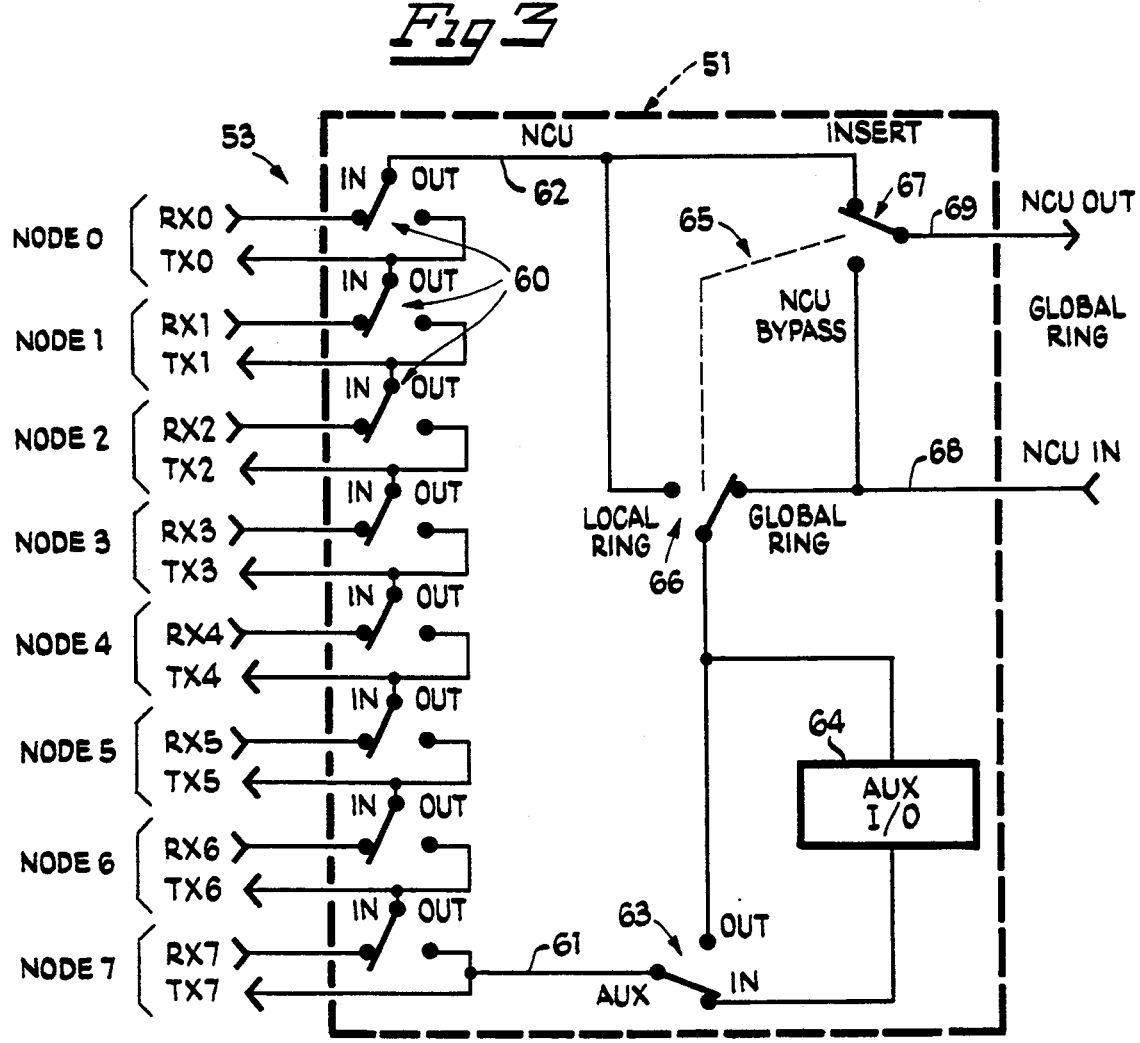

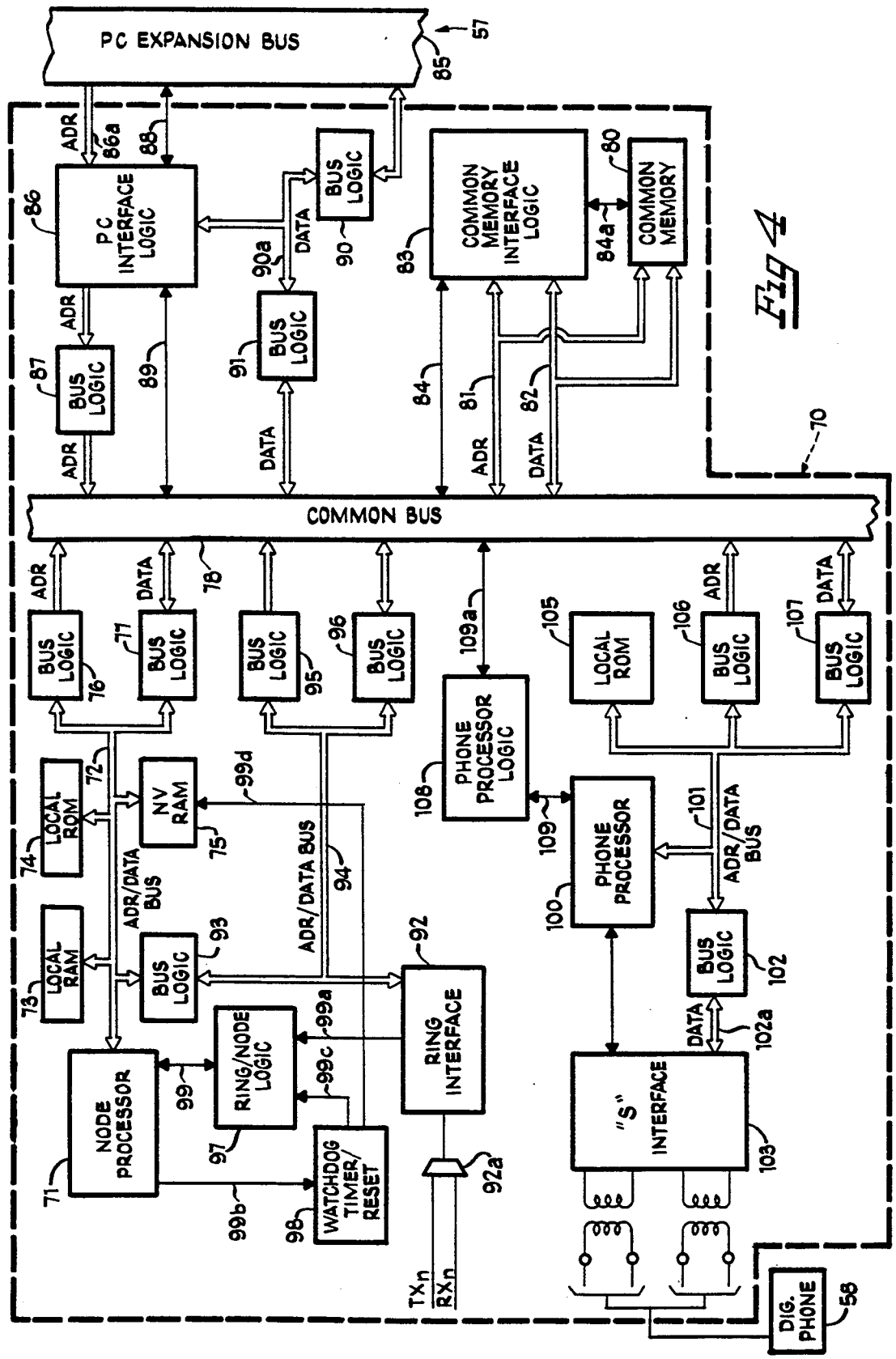

EXTERNAL LINE
FEATURE DEVICE TASK (SEE FIG.8)

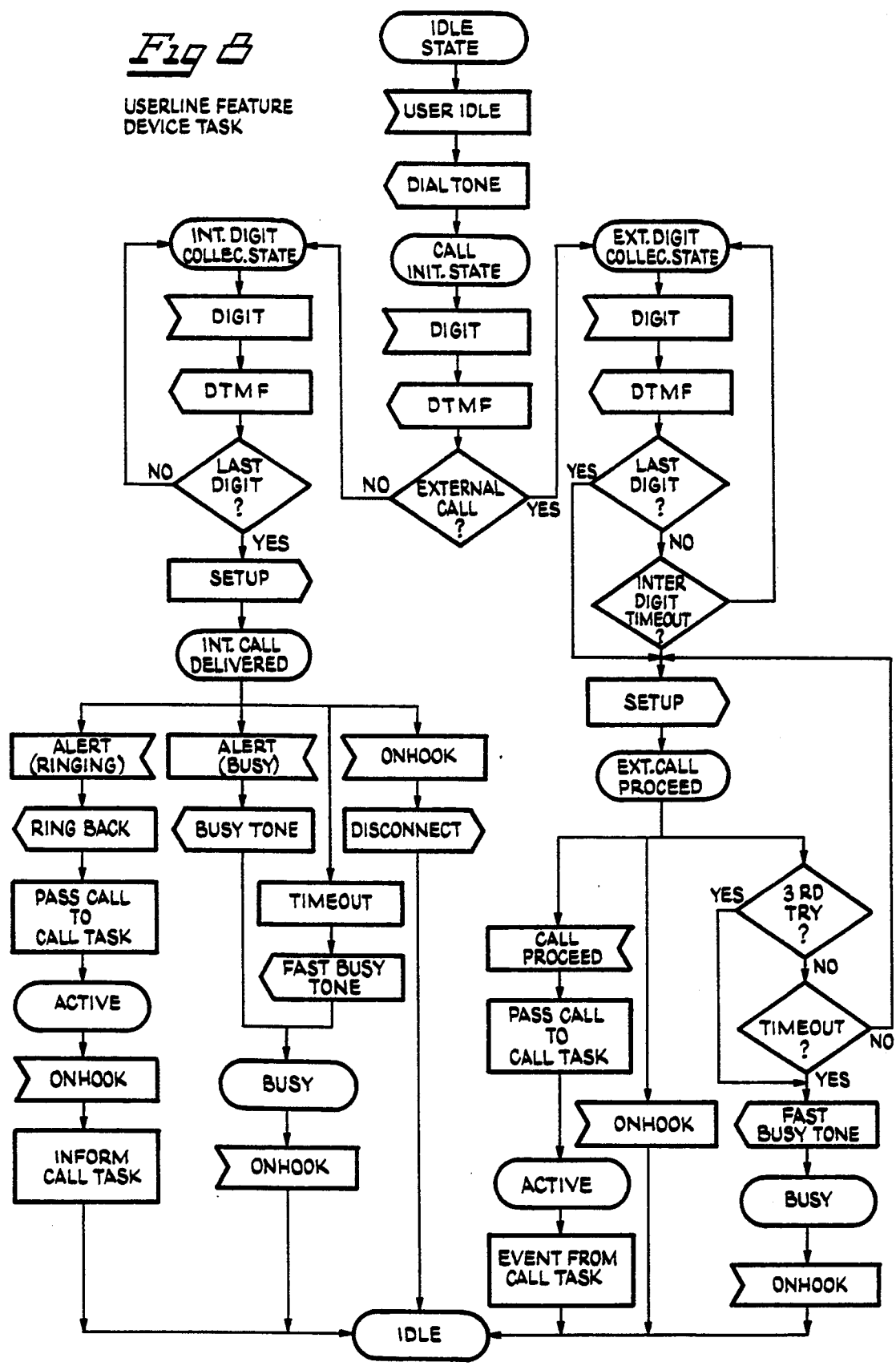

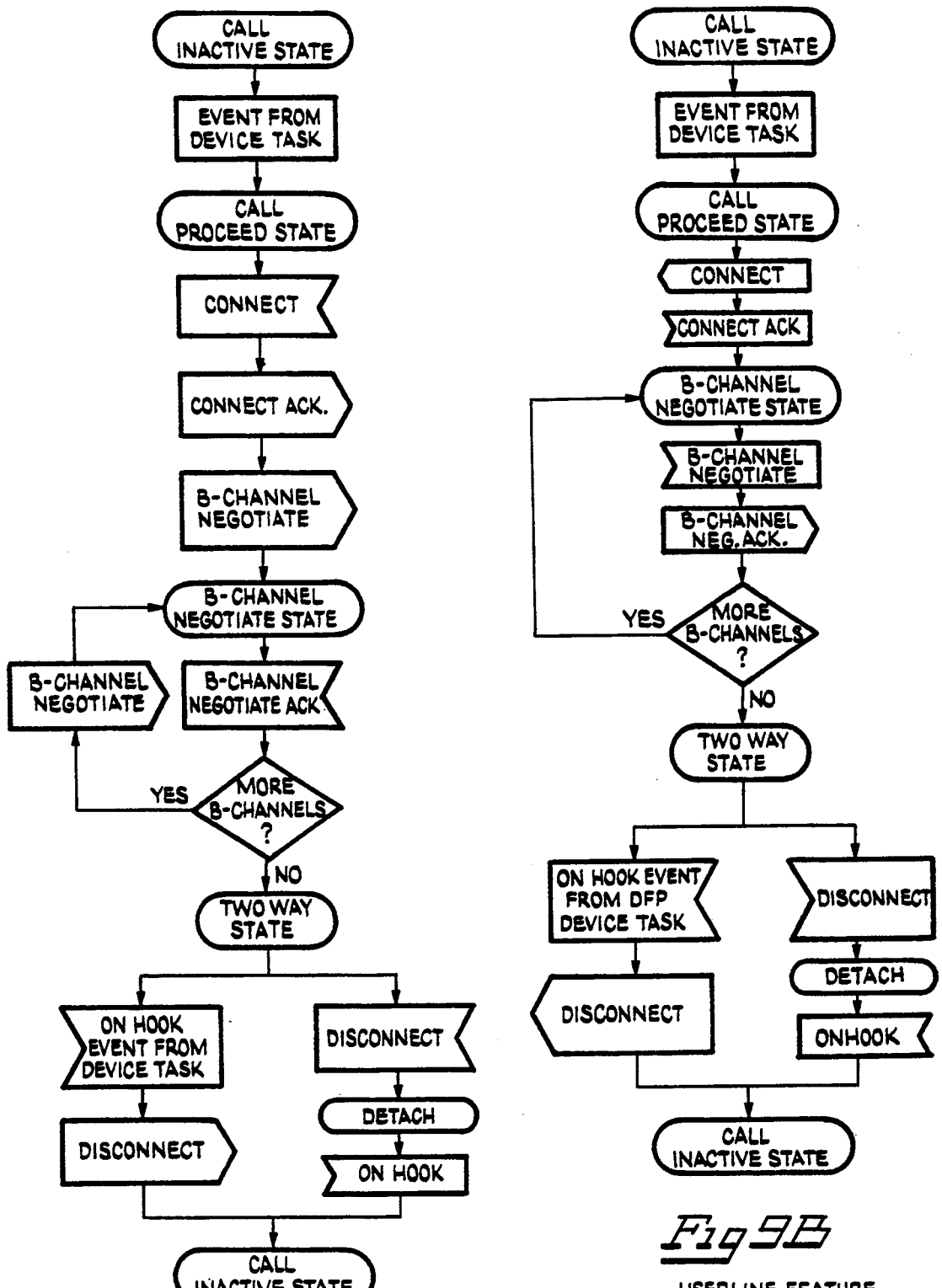

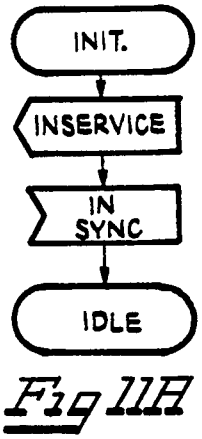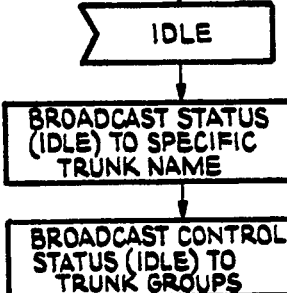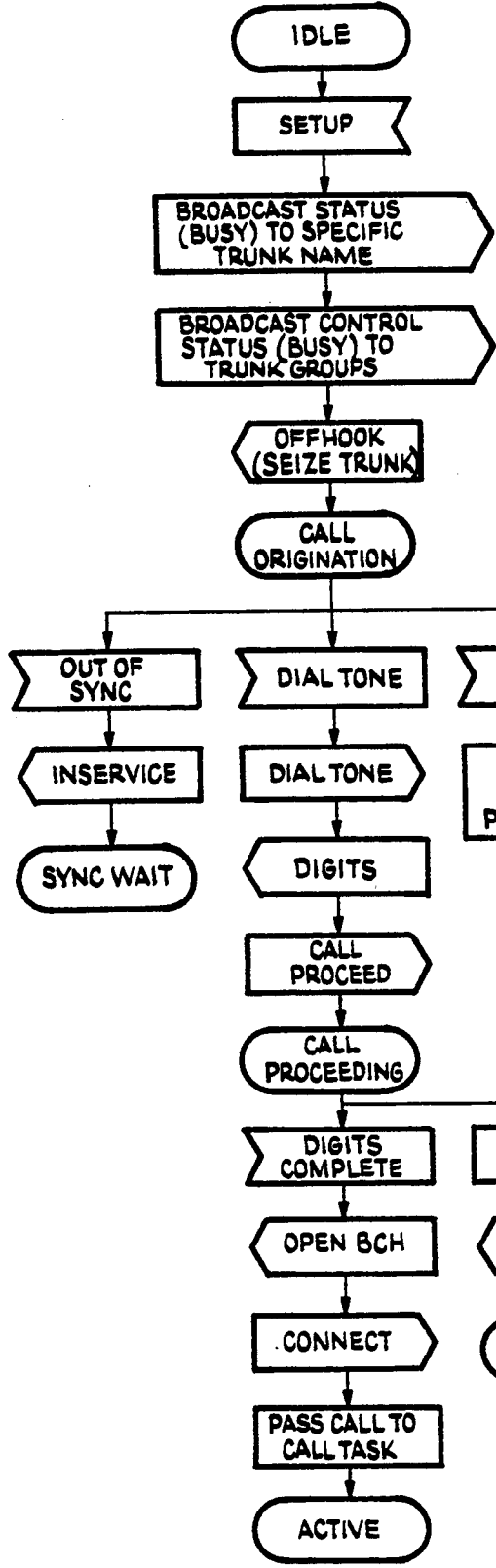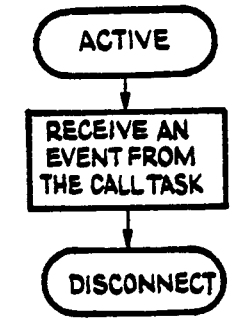

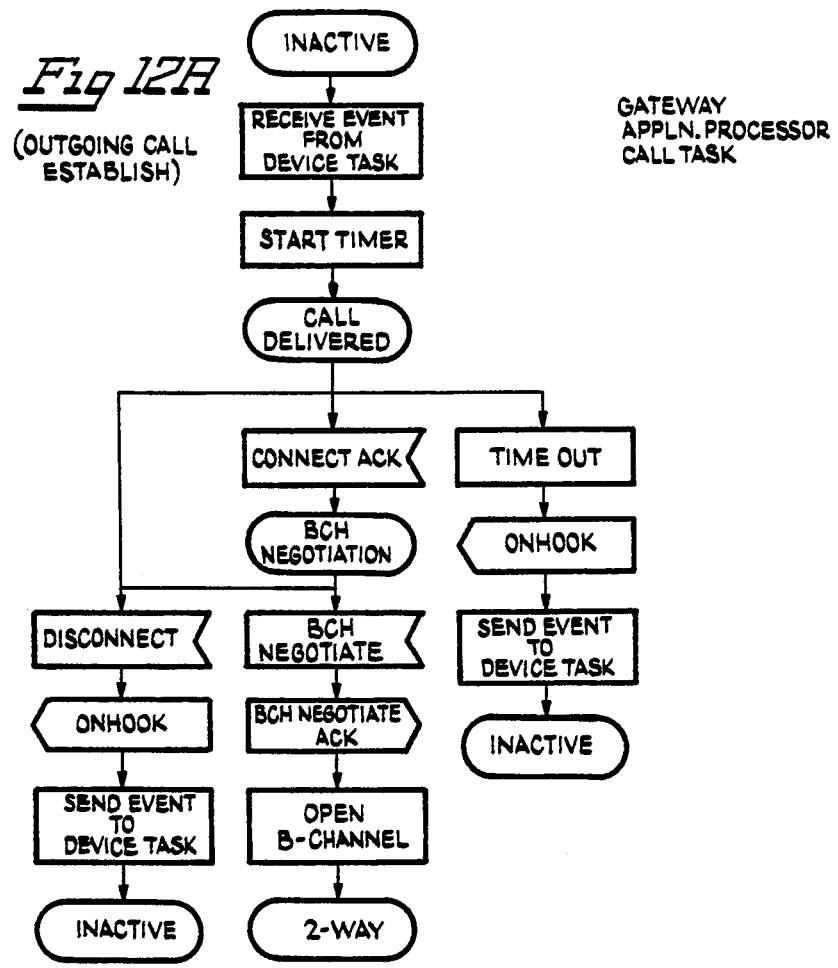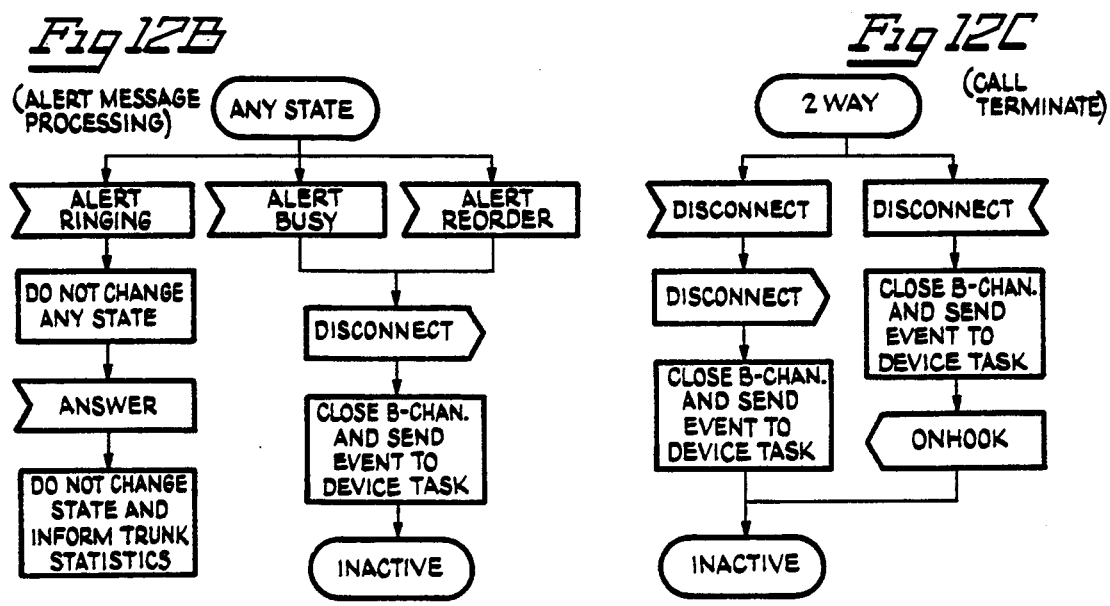

GATEWAY
CALL SIGNAL PROCES.
OUTGOING CALL (DEVICE TASK)

(CALL TASK CONT)

GATEWAY
APPLN. PROCESSOR
INCOMING CALL (CALL TASK)

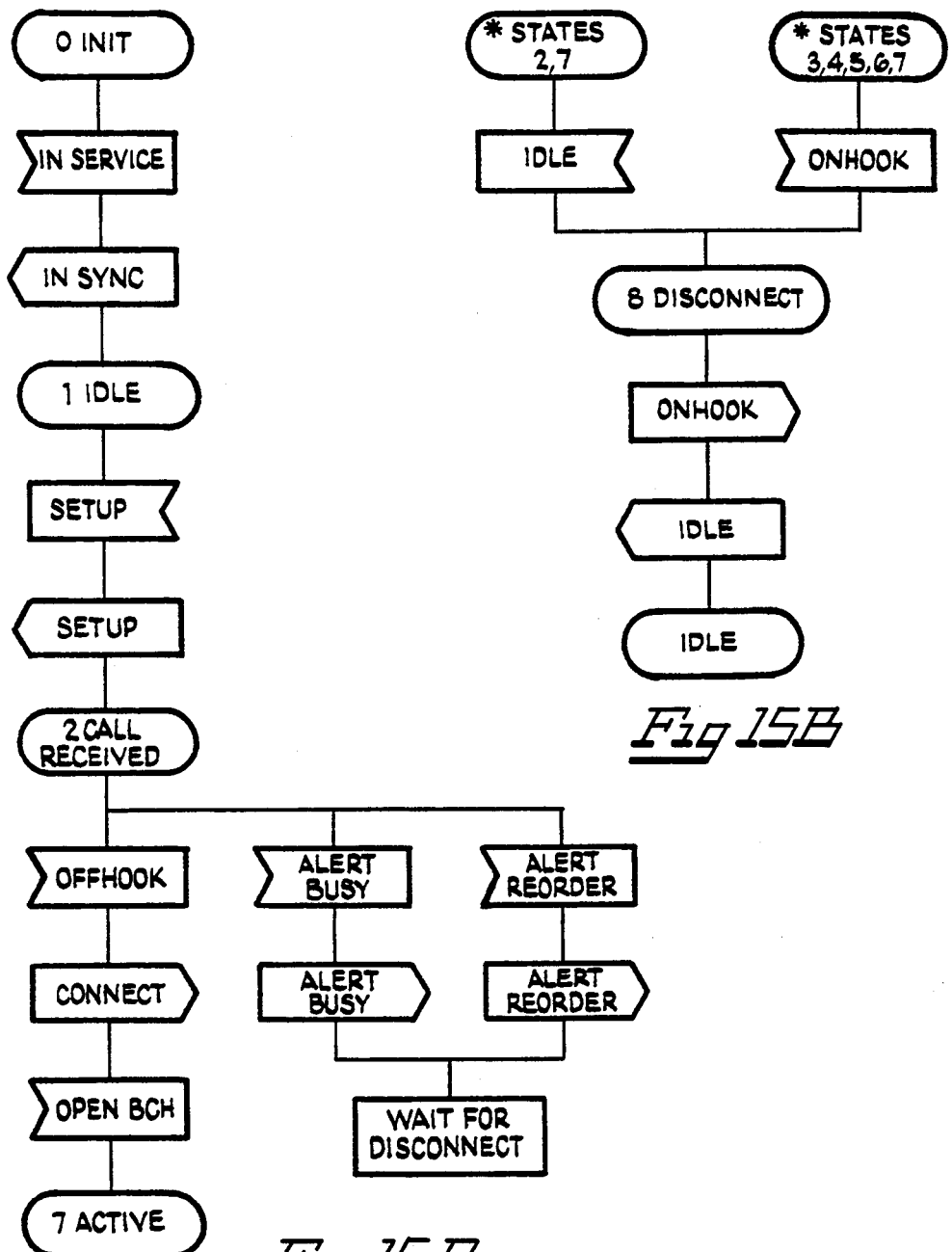
Fig 15A
GATEWAY
CALL SIGNALLING PROCESSOR
INCOMING CALL
Fig 15B
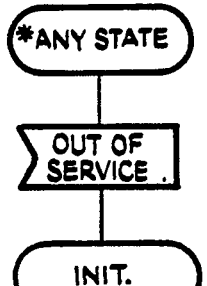
Fig 15C

CONFERENCE MASTER STATES

CONFERENCE
FIRST PARTY STATES

CONFERENCE
SECOND PARTY STATES

COMMUNICATION NETWORK INTEGRATING VOICE DATA AND VIDEO WITH DISTRIBUTED CALL PROCESSING

BACKGROUND OF THE INVENTION

1. Field of the Invention

The invention relates to apparatus and methods for providing multi-media communication over a private communication network of the type known as a local area network (LAN).

2. Description of the Prior Art

Many types of LANs are known, but they are fundamentally data networks. Local private telephone networks are also well known. However, to date, there has been no effective integration of voice and data technoloay in a private communication system or LAN.

Integration of voice and data has been accomplished on public communication systems, such as those in accordance with the Integrated Services Digital Network (ISDN) specification. But ISDN, like other public telephone systems, is fundamentally circuit switched, i.e., each communication is afforded a dedicated channel for the duration of the communication which is an inherently inefficient system, because typically each subscriber utilizes its allotted channel for a relatively small amount of the available time. Furthermore, communications are limited because there is only a portion of the available bandwidth allotted to each subscriber. Also, switching is centralized so that a failure at the switching center can result in failure of the entire network. These inefficiencies can render it prohibitively expensive to provide the necessary channel capacity in a private network.

This problem can be alleviated in a LAN by the use of token ring technology wherein the entire system bandwidth is made available to each subscriber on a random access basis by providing packet switched rather than circuit switched transfer of information. In such token ring systems the terminals are interconnected in a ring architecture and access to the network is provided by circulating tokens around the ring. Such systems have been used quite effectively for asynchronous applications, such as data transmission, but have not been readily adaptable for synchronous communications, such as voice, which cannot be interrupted and must be received essentially in real time. Heretofore it has not been possible to effectively integrate data and digitized voice on a token ring network so as to afford adequate capacity for data transmission while at the same time effecting real-time voice transmission with no loss of voice information.

Digital telephone networks have been developed which provide a wide variety of useful call processing features. However, most such systems control call processing from a central control station. This adds expense to the system and, furthermore, risks failure of the entire network, as explained above. It is possible to distribute the call processing functions to each telephone device in the network by providing, at each such device, an address table containing all of the addresses of all of the stations in the network, but this also adds significantly to the expense of the system and complicates the addition and deletion of stations.

Several attempts have been made to provide integrated voice, data and video communication on private LANs, but all have required, to some degree, a centralized control. Examples of such systems are disclosed in U.S. Pat. Nos. 4,866,704 and 4,843,606 which provide for integrated voice and data services on a token ring network, but in both systems switching is controlled by an external PBX or PABX unit. Another packet-switched integrated voice and data system is disclosed in U.S. Pat. No. 4,663,758, but it utilizes a network control center which stores a central data base for controlling the system.

U.S. Pat. No. 4,757,497 discloses an integrated voice and data system in which one of a plurality of interconnected nodes is a digital voice switch for the entire network. Furthermore, the system uses frequency division multiplexing.

Another approach is utilized in U.S. Pat. No. 4,557,651, which discloses a system having dual token rings, one of which is a time division multiplex ring for carrying voice, with one of several nodes on the ring acting as a master controller for any given communication.

There is a need for a private communication system which can effectively integrate voice and data communications over a single communication medium, while providing fully distributed control.

One commonly used feature of digital telephone systems is conference calling, wherein more than two parties are simultaneously in conversation with one another. In a packet-switched network, this means that each party to the conference must send its packets of voice information to each of the parties to the conference and must, in turn, receive voice packets from each party to the conference. This significantly multiplies the number of packets which must be handled by the network in any given unit of time. For a two-party communication there are only two packets, one originating at each party. For a three-way conference there are six packets, since each party must send packets to each of the other two parties. In packet-switched networks, such as token ring networks, there are a plurality of stations or node concentrators connected in the ring, with each station being coupled to a plurality of nodes or terminals. Typically, such station apparatus has a limited packet-handling capacity. Thus, the implementation of call conferencing may severely limit the number of nodes which can be coupled to a station and thereby limit the size of the network.

SUMMARY OF THE INVENTION

It is a general object of the invention to provide an improved system and method for providing voice, data and video communications, which avoids the disadvantages of prior systems while affording additional structural and operating advantages.

An important feature of the invention is the provision of a communication system which effectively provides integrated voice, data and video communication on a LAN.

Another feature of the invention is the provision of a system of the type set forth which insures real-time reception of voice communications while accommodating data traffic.

Still another feature of the invention is the provision of a system of the type set forth which provides fully distributed call processing without the use of a central processing or switching unit or a central data base.

Yet another feature of the invention is the provision of a system of the type set forth which affords efficient multi-party call conferencing.

In connection with the foregoing feature, still another feature of the invention is the provision of a system of the type set forth which minimizes the number of voice packets per unit time generated by a multi-party conference communication.

A further feature of the invention is the provision of improved communication methods which achieve the results provided by systems of the type set forth.

Certain of these and other features of the invention are attained by providing a communication system having a plurality of terminals not exceeding a predetermined maximum number including voice terminals interconnected in a token ring network for transmission of digital data including digitized voice signals along the ring in the form of packets of bits, wherein each terminal gains access to the ring by seizing a free token and releases a new free token onto the ring after transmission of a packet, the free token having one of a predetermined number of priority levels corresponding to the priority level of packets needed to be transmitted by the terminal releasing the free token, with packets containing voice information having a higher priority than packets containing non-voice information, the system comprising: generator means at each voice terminal for generating digitized voice signals comprising bits, buffer means at each voice terminal coupled to the generator means for collecting a group of digitized voice signals generated thereby such that the first bit in the collected group resides in the buffer means for a predetermined storage time period which is dependent on the number of bits in the collected group, packetizing means at each voice terminal coupled to the buffer means for assembling each collected group of stored digitized voice signals along with control bits into a voice packet such that all voice packets have the same number of digitized voice signals from any one terminal, transceiver means at each terminal for transmitting packets to and receiving packets from other terminals along the ring, and means at each terminal for determining the maximum length of the packets generated thereat as a function of the maximum number of terminals in the network and the predetermined storage time period in the buffer means such that the maximum token rotation time, i.e., the maximum time for a free token to circulate around the ring, is less than the predetermined buffer storage time period.

Additional features are attained by providing a communication system having a plurality of voice terminals interconnected in a network and respectively coupled to associated telephone devices for transmission along the network of formatted messages including control messages for the processing of calls and digitized voice messages, wherein all call processing functions are fully distributed among the voice terminals, each of the voice terminals having associated therewith a physical address and at least one logical name, each of the messages including a source address field containing the address of the terminal transmitting the packet and a destination address field containing the address of a specific terminal to which the packet is directed or a broadcast address if the packet is directed to all terminals on the network and information fields which may contain a name of a terminal in the case of a control message or digitized voice in the case of a voice message, the system comprising: storage means at each terminal for storing name and address data relative to only that terminal, formatting means at each terminal for forming messages, transmitting/receiving means at each terminal coupled to the formatting means for transmitting messages to other terminals and receiving messages from other terminals on the network, the transmitting/receiving means at each terminal including means for accepting all messages addressed to that terminal including broadcast messages, recognition means at each terminal coupled to the storage means thereat and operative if an accepted control message includes a name of that terminal in the information field for recognizing the message, and call processing means at each terminal coupled to the recognition means and to the packetizing means and responsive to recognized and other accepted control messages and to the condition of an associated telephone device for controlling placement and reception and switching and termination of calls to which that terminal is a party, whereby the processing of a call among terminals on the network is controlled solely by the terminals which are party to the call without a central processing unit or a central data base.

Further ones of these features are attained by providing in a communication system having a plurality of voice terminals interconnected in a token ring network and respectively coupled to associated telephone devices for transmission of digital voice signals in a transmission direction along the ring in the form of packets of bits, wherein each of the packets includes a source address and a destination address and an information field containing voice information, means for providing conference communication among more than two of the terminals on the network comprising: means for establishing a conference communication link among the terminals which are to be parties to the conference, transmitter/receiver means at each terminal for transmitting packets to other terminals and for receiving packets from other terminals on the network, packetizing means at each terminal operable if that terminal is a party to a conference for forming conference packets having the destination address of the next downstream party terminal in the transmission direction, said packetizing means including means for subdividing the information field of the conference packet into a plurality of sequential sectors including a local sector for containing voice information from the terminal forming the conference packet and one or more remote sectors for respectively containing voice information from all of the other party terminals except the destination terminal, and processing means at each terminal coupled to said transmitter/receiver means and to said packetizing means for accepting conference packets from the next upstream party terminal in the transmission direction and for copying all of the information field sectors of each accepted conference packet except for the last remote sector thereof and providing the copied sectors to said packetizing means for inclusion thereby respectively in the information field remote sectors of the conference packet being formed thereby, said processing means including summing means for summing all of the information field sectors of each accepted conference packet for simultaneous delivery to an associated telephone device.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 2 is a simplified functional block diagram of the delay encountered in transmitting voice information between two terminals of the system of FIG. 1;

FIG. 3 is a functional diagram, partially schematic and partially block, of one of the node coupling units of the system of FIG. 1;

FIG. 4 is a partially schematic and partially functional block diagram of a node adapter card at a terminal connected to one of the node coupling units in the system of FIG. 1;

FIG. 8 is a flow chart of the Device Task software for the USER LINE call processing feature of the adapter card of FIG. 1;

FIGS. 9A and 9B are flow charts of the Call Task software for internal and external calls, respectively, for the USER LINE call processing feature of the adapter card of FIG. 4;

FIGS. 11A–11D are flow charts of the Device Task software of the application processor of the gateway of FIG. 5 for an outgoing call;

FIGS. 12A–12C are flow charts of the Call Task software of the application processor of the gateway of FIG. 5 for an outgoing call;

FIGS. 15A–15C are flow charts of the software of the call signaling processor of the gateway of FIG. 5 for an incoming call;

DESCRIPTION OF THE PREFERRED EMBODIMENT

Figure 1:
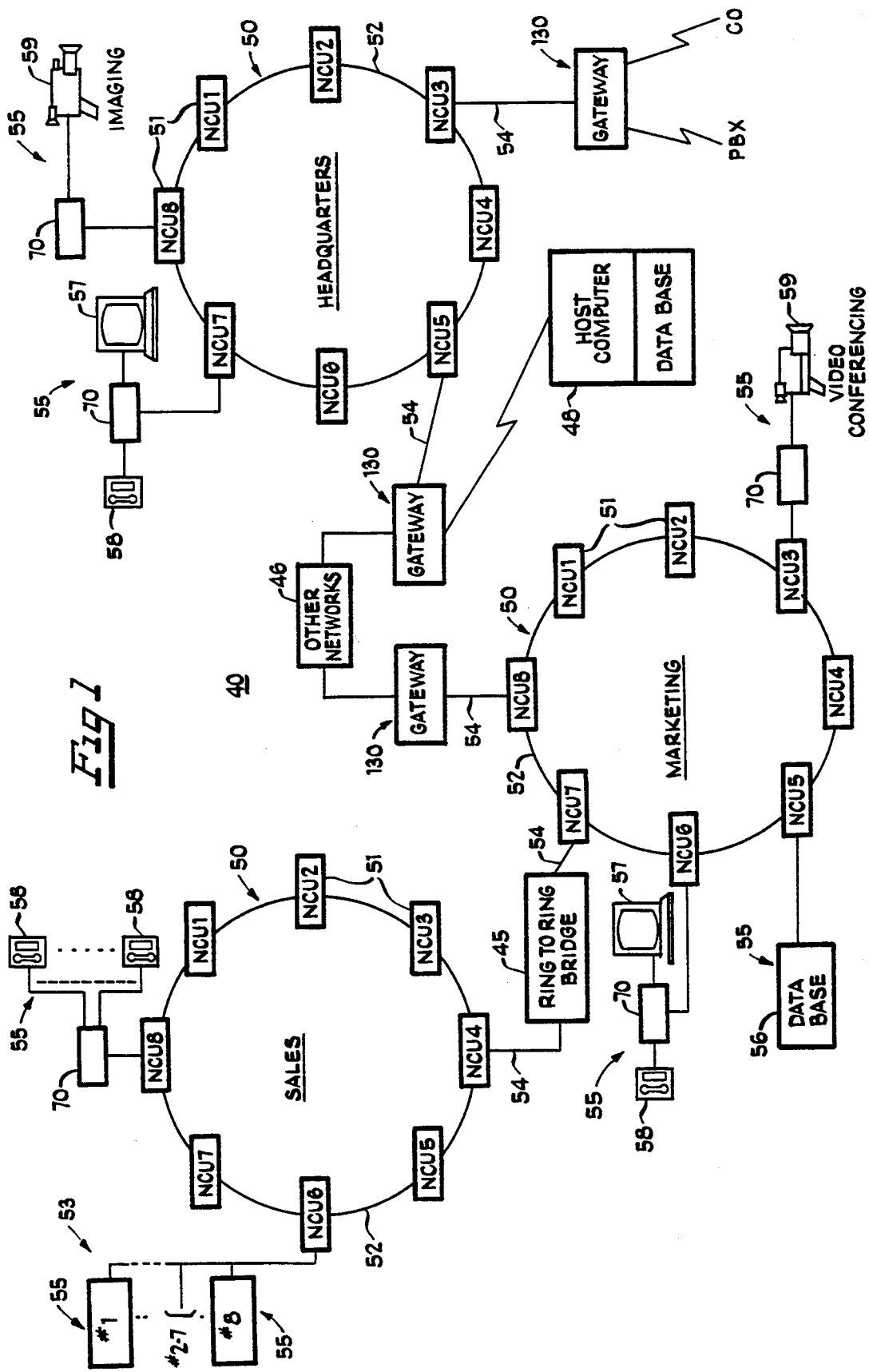
FIG. 1 is a block diagrammatic view of a communication system constructed in accordance with and embodying the features of the present invention.

Referring to FIG. 1, there is illustrated a communication system, generally designated by the numeral 40, which may comprise one or more token ring networks 50 constructed in accordance with and embodying the features of the present invention. As disclosed, the system 40 includes three token ring networks 50 coupled together, each of the networks 50 being indicated as disposed at a different location of a single organization, such as a company, but it will be appreciated that this is simply for purposes of illustration. A system may comprise any number of token ring networks 50, including one, and in a multi-network system the networks could all be disposed at a single location, such as an office building, plant or the like. If more than one token ring network 50 is included in a system, networks 50 may be interconnected by a ring-to-ring bridge 45 if the networks 50 are disposed at a common location or are relatively close to each other. Also, a token ring network 50 may be coupled to other remote networks 46, such as a PBX, a telephone central office (CO), or the like, or could be coupled to a central data base or host computer 48, by means of a gateway 130. In this way, distant token ring networks 50 can communicate with each other.

In the preferred embodiment the token ring network 50 includes up to eight stations or node coupling units (NCUs) 51 interconnected by a transmission medium 52 to define a global ring. The transmission medium 52 may be either a shielded twisted pair (STP), unshielded twisted pair (UTP), or fiber optic cable. Each of the NCUs 51 is a node concentrator which may interconnect as many as eight nodes or terminals 55 in a star-wired local ring 53. The NCU 51 may be a Smart Multiple-Access Unit of the type sold by General Technology, Inc. under the designation GT16A, which operates at 16 Mbs. Each NCU 51 includes a plurality of electronic switches operating under control of a microprocessor which monitors the token ring network 50 for proper network performance and serves automatically to insert and remove nodes 55 from the local ring 53 and to insert and remove itself from the global ring, as will be explained more fully below. In the event of coupling of two token ring networks 50 to each other via a bridge 45 or to other networks 46 via a gateway 130, the coupling between the network 50 and the bridge 45 or the gateway 130 will preferably be via a transmission medium 54 in the form of STP, UTP or fiber optic cable, operating at 16 Mbs per second. In the case of a bridge 45, other architectures are possible, depending on the application and size of the system 40.

It is a fundamental aspect of the present invention that the token ring network 50 is adapted to integrate voice, data and video information on a single transmission link. Thus, each node or terminal 55 may be coupled to one or more associated sources of such information in the form of application devices, such as a data base 56, a personal computer (PC) 57, a telephone 58 or an imaging system 59. The interconnection of these application devices is effected through an adapter card 70 at each node 55, as will be explained more fully below. Where applicable, analog-to-digital and digital-to-analog conversion, data processing, display and storage operations are performed by the application devices 56–59.

The token ring network 50 protocol complies with the IEEE 802.5 token ring standard specification, which defines a distributed packet switching system. Data from an application device is sent to an adapter card 70 at a node 55 for transmission to an intended receiving application device. The adapter card 70 takes this data and converts it to a series of messages, or packets, each of which also contains protocol and routing information. The node 55 sends each packet through the local ring 53 of nodes, where each node listens and sends the same packet to its neighboring node. Simple daisy-chain communications suffer from the "weak link" syndrome. If one node in the daisy chain fails, then the entire system fails. To prevent this, each local ring 53 of the token ring network 50 is designed as a star-wired logical ring. Nodes 55 are connected to an NCU 51 which acts as a switch that connects the nodes 55 into a communication data chain or a logical local ring 53 and prevents system breakdown when any node 55 fails.

Distributed packet switching in accordance with the IEEE 802.5 standard is entirely protocol dependent because destination information is embedded in each packet. Unlike centralized, star-wired switching systems that establish conversation circuits, e.g. (PABX phone systems), the NCU 51 merely provides the logical ring signal path among all active nodes. A node 55 must be active to receive and send distributed data packets. Therefore, if a node 55 is active, it should be inserted into the local ring 53 by the associated NCU 51. Because inserting a node 55 is entirely data independent, each NCU 51 can be conveniently located near its set of attached nodes 55. This means that NCUs 51 can be physically separated from each other while attached to a single cable that connects one NCU 51 to the next NCU 51. The chief function of the NCU 51 is to insert or remove nodes 55 from the logical rings. As mentioned above, there are two types of rings relative to the NCU 51. A local ring 53 describes a ring of nodes 55 connected to a single NCU 51 which controls insertion of the nodes 55 into the ring 53. In a multi-NCU token ring network 50 the NCUs 51 cooperate to define a global ring, and each NCU 51 automatically decides whether to insert itself into the global ring of all NCUs 51 or to simply create a local ring 53 of the nodes 55 attached to that NCU 51.

Referring to FIG. 3, the operation of an NCU 51 will be described. FIG. 3 is a functional diagram and while, for purposes of illustration, the switches are illustrated as electromechanical switches, it will be appreciated that in practice the NCU 51 may be an electronic device operating under microprocessor control. The NCU 51 has eight node channels respectively connectable to eight nodes 55, designated 0 through 7. Each channel has a line leading into the node designated TX and a line leading out of the node designated RX, respectively connected to the fixed contacts of a node insertion switch 60 which functions as a single-pole, double-throw switch. The TX contact of the first switch 60 (node 7) is connected to an input conductor 61. The node insertion switches 60 are interconnected with the movable contact of each switch being connected to the TX contact of the succeeding switch, in the transmission direction (clockwise in FIG. 3), except for the movable contact of the last switch 60 (node 0), which is connected to an output conductor 62. The input conductor 61 is also connected to the movable contact of a functional single-pole, double-throw auxiliary switch 63, which has its fixed contacts respectively connected to the terminals of an optional auxiliary input/output channel 64 which provides a ninth local ring channel and permits invasive or non-invasive traffic monitoring, delay line insertion or local channel expansion within the NCU 51 without sacrificing a node channel. The auxiliary channel 64 is internally monitored by the NCU 51 logic to prevent insertion when the channel is inactive. The fixed contacts of the node insertion switches 60 and the auxiliary switch 63 are respectively labeled "IN" and "OUT", and it can be seen that when the switch is in the IN position the associated node or auxiliary channel is inserted in the local ring, and when it is in the OUT position the node or channel is removed from the local ring.

The NCU 51 also includes a mode switch 65 which functions as double-pole, double-throw switch having poles 66 and 67. Pole 66 has its movable contact connected to the OUT contact of the auxiliary switch 63, and has fixed contacts respectively connected to the output conductor 62 and the NCU input line 68 from the global ring. Pole 67 has its fixed contacts respectively connected to the NCU input line 68 and the output conductor 62, and its movable contact connected to the NCU output line 62 to the global ring.

In operation, the NCU 51 can be in either the local ring mode or the global ring mode. In FIG. 3, the NCU 51 is illustrated in the global ring mode wherein the local ring 53 formed by the NCU 51 is inserted in the global ring, so that all of the nodes 0 through 7 and the auxiliary input and output channel 64, which are inserted in the local ring 53, are also inserted in the global ring in a continuous chain. When the NCU 51 inserts itself into the global ring, it breaks its own local ring 53 via the mode switch 65 so that traffic from other NCUs 51 flows into the attached nodes. It can be seen that when the mode switch 65 is switched to its other position the NCU 51 will be in its local ring mode wherein the nodes 0 through 7 and the auxiliary input/output channel 64 are all connected in a common local ring 53 which is closed and removed from the global ring which bypasses the local ring 53. More specifically, the pole 67 of the mode switch 65 directly interconnects the NCU input and output lines 68 and 69 from the global ring when the NCU 51 is in its local ring mode, to insure integrity of the global ring even though the NCU 51 is not inserted in the global ring.

In operation, each active node 55 receives synchronous serial data from its upstream neighbor and then sends data to its downstream neighbor, all via the NCU 51. A node channel is active when the NCU 51 detects valid incoming traffic from the channel. The NCU 51 contains circuitry (not shown) which controls the node insertion switches 60 to automatically route node traffic from one active node channel to the next active node channel. If an active node channel should fail, the NCU 51 bypasses the failed node channel by switching its associated node insertion switch 60 to the OUT condition, maintaining the local ring 53 intact with the remaining active nodes. In some failure modes the NCU 51 will remove itself from the global ring while maintaining an active local ring 53. The NCU 51 automatically switches to the global ring mode when valid traffic exists on the global ring. Thus, when two or more NCUs are interconnected in a global ring, traffic flows through all active nodes in all NCUs 51 in the global ring, so that each active node becomes part of the global ring. In all cases, the NCU 51 is transparent to actual data and control information.

It is significant that NCU operation is entirely self-contained, i.e., insertion decisions are made solely at the NCU 51 and are not controlled by any other device. Since the NCU 51 is a self-contained entity in the token ring network 50, it does not restrict installation or layout plans. The NCU 51 can be conveniently located near attached nodes 55, and then it connects at the global ring level to other NCUs elsewhere in the token ring network 50. It will be appreciated that the NCU 51 automatically selects its mode of operation based upon traffic activity at the NCU input line 68 from the global ring. As indicated above, the token ring network 50 may comprise only a single NCU 51, in which case there is no global ring and the token ring network 50 comprises simply the local ring 53 established by the single NCU 51.

A key aspect of the present invention is the adapter card 70, which provides the interface between and individual application devices 56–59 and an associated NCU 51 of the token ring network 50. It is the adapter card 70 which provides the ability to integrate voice, data and video onto a token ring network 50. The adapter card 70 may be in either one of two forms, viz., a plug-in form which is adapted to plug into an expansion slot of a PC 57, and a stand alone form which may be provided with its own separate housing for either desk or wall mounting. When the adapter card 70 is to be coupled to a PC 57, it is provided in the plug-in form, but it will be appreciated that it can simultaneously be connected to a telephone 58, as is illustrated in FIG. 1. Where no PC 57 is used at a node 55, the adapter card 70 is provided in the stand alone form which is connected to an associated application device, such as a data base 56, a telephone 58 or an imaging system 59. In the preferred embodiment, an adapter card 70 may be connected to as many as eight telephones 58 at a node 55.

Referring to FIG. 4, the adapter card 70 has a node processor 71, which may be an 80186 microprocessor, and which serves as the central control for the interfaces of the adapter card 70 with the token ring network NCU 51, with a PC 57 and with a telephone 58, which is preferably a digital feature phone. The node processor 71 is coupled by an address/data bus 72 to a local RAM 73, which may be in the form of a plurality of static RAM devices, and a local ROM 74, which may be in the form of a pair of EPROMs. The local ROM 74 contains the code that the node processor 71 executes. The address/data bus 72 is also coupled to a non-volatile RAM 75 which may constitute a plurality of NV RAM devices. The address/data bus 72 is coupled through bus logic 76 and 77, which respectively provide address and data interfaces, to a common bus 78. The common bus 78 is coupled via address and data buses 81 and 82 to a common RAM memory 80, which may comprise a pair of 64K×8-bit RAMs, and common memory interface logic 83, which may be in the form of an application-specific integrated circuit (ASIC). The common memory interface logic 83 is connected to the common bus 78 and to the common RAM memory 80 by control lines 84 and 84a, respectively.

The adapter card 70 is plugged into an expansion bus 85 of a PC 57. More specifically, there is provided PC interface logic 86 which is coupled through an address bus 86a to the expansion bus 85 and via bus logic 87 to the common bus 78. The PC interface logic 86 is also connected to the PC expansion bus 85 by a control line 88 and to the common bus 78 by a control line 89. Data is passed through a data bus 90a via bus logic 90 between the expansion bus 85 and the PC interface logic 86, and via bus logic 91 between the PC interface logic 86 and the common bus 78.

The adapter card 70 also includes a ring interface 92 which controls the coupling with the token ring network 50. The ring interface 92 is coupled via a connector 92a to the corresponding node lines of the associated NCU 51 on the token ring network 50. It is also coupled via bus logic 93 and address/data bus 94 to the address/data bus 72, the address/data bus 94 further being coupled via address and bus logic 95 and 96 to the common bus 78. The ring interface 92 may be a chip set such as that sold by Texas Instruments Corp. under the designation TMS380C16, and it includes a microprocessor and local memory to buffer packets to and from the token ring network 50. A ring/node logic device 97 is coupled via control lines 99 and 99a, respectively, to the node processor 71 and the ring interface 92. A watchdog timer/reset circuit 98 is coupled by control lines 99b and 99c, respectively, to the node processor 71 and to the ring/node logic 97, and via control line 99d to the non-volatile RAM 75.

The adapter card 70 also includes a phone processor 100 which is coupled via an address/data bus 101 through a data bus logic 102 and to a data bus 102a to an "S" interface 103 to the digital feature phone 58. The phone processor 100 is also coupled via the address/data bus 101 to local ROM 105 which stores the program code executed by the phone processor 100 and, through address and data bus logic 106 and 107, which, respectively, provide address and data paths to the common bus 78 via address and data busses 106a and 107a. Phone processor logic 108 is coupled via control lines 109 and 109a, respectively, to the phone processor 100 and the common bus 78.

In operation, the adapter card 70 provides communication among the token ring network 50, the PC 57 and the digital feature phone 58 through the common memory 80 under control of the node processor 71. Not all of these devices can have access to the common bus 78 at the same time. Thus, they have to wait their turn and this arbitration is accomplished by the ring/node logic 97. The watchdog timer/reset 98 is periodically toggled by the node processor 71 via the control line 99b, to indicate that the node processor 71 is running viable code. If a toggle signal does not appear for a predetermined time period, the watchdog timer/reset 98 generates a reset signal via the control line 99c to reset the adapter card 70, indicating that something is wrong. The watchdog timer/reset 98 also provides voltage detection circuitry. If power to the adapter card 70 is lost, this condition will be detected and the watchdog timer/reset 98 will provide a battery voltage to the non-volatile RAM 75 via the control line 99d, so that the RAM 75 will retain the information stored therein. The non-volatile RAM 75 stores the data base information for the digital feature phone 58, including the logical names or telephone numbers associated with it, the node address of the adapter card 70, and information for various call processing functions. Preferably, the NV RAM 75 includes a plurality of RAM devices and the watchdog timer/reset 98 serves to select among those devices. In the event of a power failure, the watchdog timer/reset 98 essentially deselects the NV RAM devices and puts the RAM 75 into a standby or battery backup mode, wherein it will hold the contents of its memory but cannot be accessed until normal power is returned.

The common memory interface logic 83 provides an interrupt structure causing interrupts to the node processor 71 from the various interfaces 86, 92 and 103, or to those interfaces from the node processor 71. The "S" interface 103 to the digital feature phone 58 may be provided by 8930 and 8940 chips of the type made by Mitel. They provide a communication channel to the digital feature phone 58 so that data can be transferred to and from the phone 58. The digital feature phone 58 converts analog voice to digitized voice in a MU-LAW PCM format. When digitized voice is coming from the phone 58 it is in serial form, and the interface 103 converts it to parallel form and presents it to the phone processor 100 and to the common memory 80. The interface 103 provides two 64 Kbs channels, referred to as "B channels", and a 16 Kbs signaling or data channel, referred to as a "D channel", all of which are established at initialization. The digitized voice to and from the adapter card 70 will use one of the B channels, while the D channel will contain all of the signaling information to signal between the adapter card 70 and the phone 58. The interface 103 receives both digital voice and control information from the phone 58, and writes it into the common memory 80. The digitized voice signals are organized into voice packets in the common memory 80 under the control of the phone processor 100.

The PC interface logic 86 is an extension of the PC expansion bus 85, so that the adapter card 70 will function as a device mapped into the memory space of the PC 57. Thus, communications between the adapter card 70 and the PC 57 will be memory mapped. The PC 57 will transfer data and control information to and from the adapter card 70 through the expansion bus 85 to the shared common memory 80.

The ring interface 92 provides a prioritized mechanism. Thus, in accordance with the IEEE 802.5 standard, each packet will include three priority bits for designating one of seven different priority levels. A fundamental aspect of the invention is that voice packets are assigned the highest priority, so that they will be serviced first, and non-voice packets are assigned a lower priority, under the control of the node processor 71, and this is all done in software. The ring interface 92 provides an industry standard software interface in accordance with the Open Systems Interconnection (OSI) model defined by the International Organization for Standardization. The OSI model defines a seven-layered protocol. The lowest two layers, the Physical and Data Link layers, of which the latter is further subdivided into Medium Access Control (MAC) and Logical Link Control (LLC), are implemented in the processor of the interface 92. Higher layers, including the Transport, Session and Application layers, are implemented in the node processor 71. Network address decoding is handled at the MAC layer.

Each packet contains a number of control frames in the form of headers and trailers, in addition to the data or information frames. The control frames include a source address frame, which contains the physical address of the originating node, and a destination address, which contains the physical address of a specific destination node or a broadcast address in the case of a packet which is to be directed to all of the nodes in the token ring network 50. The MAC layer determines whether an incoming packet has a broadcast destination address or the destination address of the node in which the adapter card 70 is located. If so, it accepts the packet, and otherwise it just simply passes it through to the next node. The adapter card 70 functions as a data adapter for a standard data LAN protocol, such as one of those sold by Novell, and as a voice packet adapter for packets associated with the distributed voice call processing function of the adapter card 70. This distinction is made at the LLC layer, and the packets are then passed to the node processor 71 which implements higher layers. Data packets are handled in accordance with the standard data LAN software and packets associated with voice call are processed via software in accordance with the present invention, all in higher layers in the node processor 71. The present invention adds a Network layer which examines broadcast packets to determine if they contain a logical name of the node or a specific application device coupled to the node. At the Session layer, the protocol determines whether the packet is a voice packet or a control packet, and at the Call Processing layer specific call processing functions are decoded.

In operation, a user wishing to place a voice telephone call from the node will initiate the call from the digital feature phone 58 by going off hook, which can typically be effected by lifting the handset, hitting a speaker phone button or hitting a feature button programmed as a user line. The phone 58 will automatically select a line, in standard fashion, and if the chosen line is idle, the phone processor 100 will return a dial tone or equivalent signal and the user will then proceed to enter the desired dialing digit sequence. If the call is being placed to another node on the token network 50, the digit sequence may, for example, be a three-digit sequence, depending upon the number of nodes in the network. When the first button is hit, the phone 58 outputs a digital signal representative of the number pressed, and it passes through the interface 103 to the phone processor 100. The phone processor 100 causes the digital information to be copied into the common memory 80, and issues an interrupt to the node processor 71, advising it of the incoming information from the phone 58. The node processor 71 examines the packet and recognizes it as part of the dialing sequence to be saved, but also recognizes that the system is in a three-digit dialing plan and that additional digits are needed. The node processor 71 causes the subsequent dialing digits to be held in common memory 80 until a complete dialing sequence is recognized, at which point the node processor 71 causes the common memory 80 to create a control packet which contains the dialed number in the logical name frame, and has a broadcast destination address and the source address of the originating node. The node processor 71 controls the flow of the packet down through the protocol layers and causes the different headers to be tacked on in the common memory 80. At the LLC layer the packet is passed to the ring interface 92, which adds the lower protocol layers and transmits the packet onto the token ring network 50 as soon as a free token is received.

The transmitted packet passes through each node in the network, and at each such node the ring interface 92 examines the packet and, since it is a broadcast packet, accepts it and, since it is associated with a voice call, passes it to the node processor 71, which determines whether it contains a logical name stored in the NV RAM 75 of the adapter card 70 for that node. If not, the packet is ignored, and if so the node processor 71 examines the status of the digital feature phone 58 at that destination node and returns to the originating node a node-to-node addressed packet indicating the status of the local phone 58 and causing the phone processor 100 at the originating node to pass to its phone 58 a busy signal if the destination line is busy or a ring back signal if the destination line is idle. If the destination phone is idle the phone processor 100 of the destination adapter card 70 will send a ringing signal to the destination phone 58. If the called party answers the phone, further control signals are exchanged between the calling and called nodes, as will be explained more fully below, and a two-way voice path is established so that voice communication may commence in the usual manner. Each phone 58 digitizes its voice information and passes it through the interface 103 and the local phone processor 100 to the local common memory 80, where it is packetized under control of the node processor 71. Each voice packet will have the source address of the node where it is generated and the destination address of the other party to the call so that it will be accepted only by that other node. In the packetizing operation, the voice samples are taken one byte every 125 microseconds and copied into the common memory 80 until a complete voice packet (128 bytes) is formed, at which point the node processor 71 is notified that the packet is complete and it causes the addition of the control frames to cause the packet to be transmitted to the other party.

In like manner, at a receiving node, the incoming voice packet is passed through the ring interface 92 to the node processor 71 which identifies it as a voice packet, and causes it to be sent to the phone processor 100 to be unpacketized. The phone processor 100 then causes a byte of the voice data to be sent every 125 microseconds through the "S" interface 103 to the digital feature phone 58, which converts the digital signals back to analog voice.

When a call is initiated the originating node becomes active, and the ring interface 92 is notified that a voice call is being transmitted and assigns it to a B-channel having the highest priority. Any data transmissions will then automatically be assigned a lower priority by the ring interface 92 under control of the node processor 71.

If a data transmission is originated from the PC 57, an interrupt signal is sent from the PC interface logic 86 to the node processor 71 and a data packet is sent to the common memory 80. The node processor 71 assigns the correct priority and controls the packetizing of the data in the common memory 80, causing it to be passed to the ring interface 92 for transmission to the token ring network 50. Because the data packet has a lower priority than voice, it cannot obtain access to the token ring network 50 until there is a break in the voice communication on the network. Furthermore, while a data packet is on the token ring network 50, a voice terminal cannot regain access. Thus, in order to insure that there will be no gaps in voice transmission which are noticeable to the user as "clicks" or lost syllables or the like, the maximum packet size is limited to 576 bytes of information, as will be explained more fully below.

A significant aspect of the present invention is that it serves to integrate voice and data on a token ring LAN, while providing for real-time voice reception. In order to insure this condition, it has been found that certain system parameter relationships must obtain. The token ring architecture introduces certain delays in the transmission of packets of information around the ring. The time required for a single bit to travel once around the ring may be defined as the walk time $T_w$, which is simply the sum of all the propagation delays in the network, viz., the node delay component which is the sum of all the times required to propagate through each of the nodes, and the internode delay component, which is the time required to traverse the transmission medium between the nodes. Thus $T_w$ will be a function of the number of nodes in the network.

Access to the ring is controlled by the circulation of a token, which may be either free or busy. The first node that needs to transmit and sees a free token can convert that free token to a busy token and immediately transmit its packet. With an early token release protocol, the node, upon completing its transmission, will generate and release a new free token. A free token moves from node to node along the ring. If a node has a queued transmit packet and will access the ring at the next free token (ignoring priorities), then it adds to the time that the free token walks the ring the amount of time needed to transmit the packet, since the next free token will be released at the end of the packet transmission. In the general case, packet size is a variable parameter, so that the free token rotation time TRT is a function of the queued transmit packet length and the number of nodes in the ring.

For transmission on the token ring, voice samples must be packetized, i.e., a series of digitized voice samples must be collected and stored as a group. With a shared resource, such as the network bandwidth, instantaneous access to the destination does not exist. If a Synchronous Boundary is defined as the interval between the last voice sample of the current voice packet and the first voice sample of the next sequential voice packet, then in order for the voice to remain "real time", i.e., continuous at the destination end, new voice packets must arrive or be available at the destination end prior to playback completion of the current packet. This synchronous availability of packetized voice samples is dependent upon the arrival rate of voice packets at the destination node. The time a voice sample is stored during formation of a voice packet determines the minimum arrival rate of these packets. If a voice packet transmission delay is defined as the interval between the time of a Synchronous Boundary (end of current voice sample collection) to the time the packet is delivered to its destination, then voice packet transmission delay in the token ring must be less than the period of the Synchronous Boundary in order to insure real time voice at the destination node.

Referring to FIG. 2, the voice packet transmission delay is the sum of a number of components, viz., the transmitter delay, the ring delay and the receiver delay. The transmitter delay at the transmitting node includes the time 120 to collect a predetermined number of voice samples (128 bytes in the preferred embodiment) and store them in common memory, $T_{bf}$; and the time 122 required to packetize the collected samples into a packet by adding the necessary control frames under the control of the node processor 71.

The ring delay includes the time 124 required for the packet to access the ring, i.e., the time required to request a token and await the arrival of a free token, and the time 125 to transmit the packet. It will be appreciated that the time 124 is the token rotation time TRT, i.e., the average time between free tokens as seen from the point of view of any node on the ring. When a free token enters a node with a pending packet in the transmit queue, then the free token is converted to a busy token and the voice packet is placed serially (bit-by-bit) onto the ring. The voice packet will exist on the ring for one complete circulation and is automatically stripped off the ring by the source node. Thus, the time 125 that the packet is on the ring is the time required to transmit the packet plus the walk time $T_W$.

The voice packet arrives at its destination node and is stored in a receive queue and copied into an empty receive packet buffer, unpacked and examined and, when the Synchronous Boundary occurs, the first samples are presented to the digital phone for playback. The receiver delay includes the times 126 and 128. The time 126 is the time required to unpacketize the packet. To guarantee that the voice buffer is full at the next synchronous voice boundary, a double buffer queue is maintained, and the time 128 is the time that a sample is stored in the buffer, i.e, twice the time 120 which was required to collect the samples in a buffer at the transmit node or 2 $T_{bfr}$.

Since voice packet arrival must occur by the time of the Synchronous Boundary, then the period of the Synchronous Boundary sets the minimum packet arrival rate per voice session, where a voice session is the unidirectional virtual circuit connection between two nodes. A packet is both transmitted and received with each token and, therefore, token rotation time TRT determines voice session capacity. If a node were designed to support one voice session, then the Synchronous Boundary period sets maximum TRT. This means that instantaneous TRT could vary from the walk time $T_w$ up to $T_{bfr}$, the buffer storage time for the voice samples in a single voice packet. But if there exists a node that can simultaneously support up to N voice sessions, then TRT must be scaled to allow multiple voice packet delivery to that node within one Synchronous Boundary in the system. Because TRT is a network parameter, all nodes would observe the token rotation at this higher rate. Thus, in order to insure real-time voice, it is necessary that the maximum TRT be less than $T_{bfr}/N$.

Thus, real-time voice sessions can be supported by controlling the upper limit of TRT (by controlling the number of nodes in the network), for any given $T_{bfr}$ (a function of packet size, i.e., 128 bytes for voice packets) and N (eight in the present invention). Since the ISDN standard voice sample transmission rate is 8 Kbs, $T_{brf}$ will be 16 ms for a 128-byte voice packet. In the present invention the token ring network accommodates not only voice, but also data. Thus, if we assume a maximum number of nodes and sessions per node, real time voice can be assured by controlling the maximum $T_{bfr}$, which is a function of maximum packet size which, in the present invention, has been determined to be 576 bytes for a 64 node ring. This is a standard packet size which most closely approximates a size which will fulfill the requirements of the present invention without exceeding that size.

A digital feature phone 58 is typically designed to support not only the basic call processing functions of call initiation, maintenance and termination, but also such functions as conference calling, speed calling auto dialing, call forwarding, call muting, call transferring, call holding and call status monitoring. In a typical telephone system, implementation of these call processing functions requires a central switching controller and/or a central data base. It is a fundamental aspect of the present invention that it provides completely distributed call processing, so that the processing of a call is controlled solely by the parties to the call without the use of any centralized control instrumentalities. More specifically, each node adapter card 70 which is coupled to one or more digital feature phones 58 maintains in its non-volatile RAM 75 a table containing its own physical address and the non-unique logical names (typically telephone numbers) associated with it. For example, a digital phone typically has multiple line buttons and there is a logical name associated with each. The RAM 75 also includes a unique logical name, based upon the physical node address, for each telephone device coupled to the node (for purposes of call transfer between extension telephone devices coupled to the same node). However, the node 55 has no knowledge of any other node in the system 40 or, indeed, on the token ring network 50 of which it is a part. Instead, a call processing protocol has been adopted whereby any node can initiate a call with any other node and, in combination with that other node completely control all call processing functions in connection with the call.

Each digital feature phone 58 in the token ring network 50 typically has a plurality of lines (feature buttons) for making and receiving calls. Some of these can be internal lines ("user lines") used to call other nodes within the network 50. Others can be external lines, used to make and receive calls through a gateway 130 (described below). Still others can be programmed to be associated with a specific feature. Calls are made, and many call processing features are controlled, by sending messages to other nodes using distributed call processing. The software for controlling the distributed call processing functions will be described more fully below.

Figure 5:
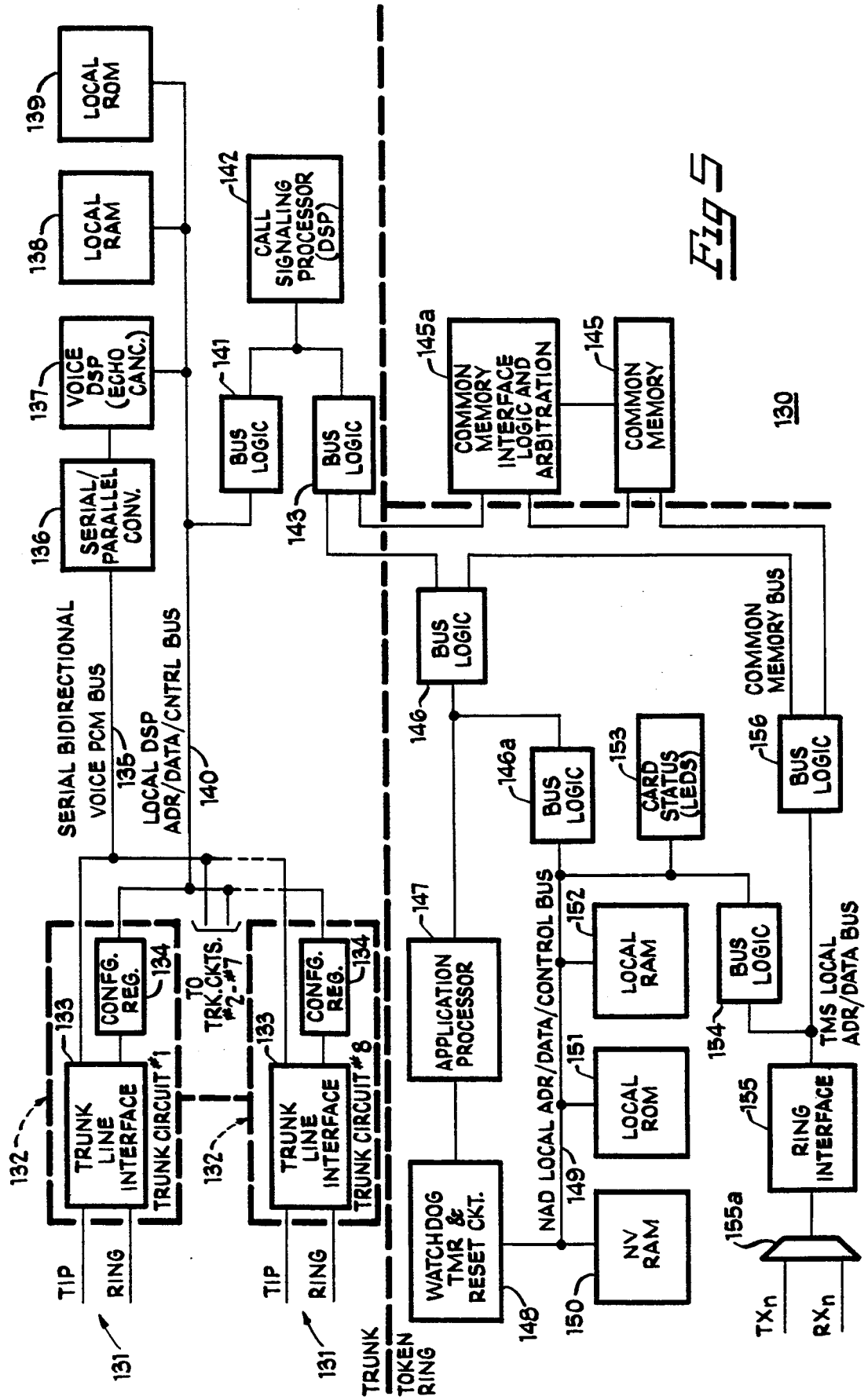
FIG. 5 is a functional block diagram of one of the gateways of the system of FIG. 1.

Referring to FIG. 5, there is illustrated the gateway circuit 130, which is in the nature of an adapter card similar to the card 70, except that it handles voice only and is not adapted for coupling to a PC or to a phone device. The gateway 130 may include a single such card, as illustrated in FIG. 5, which accommodates eight trunk circuits, but it will be appreciated that multiple gateway cards could be mounted in a common card case to provide additional trunk circuits.

The gateway 130 provides an interface between up to eight external PBX or CO trunks and the token ring network 50. In general, the portions of the gateway circuitry which are above the horizontal broken line in FIG. 5 deal with the trunk interface, while the portions below that line and to the left of the vertical broken line deal with the token ring interface. The gateway 130 is organized into three sections, viz., the call signaling processing section, which deals with the trunk interface, and the application processing and ring interface sections which deal with the token ring network interface. Data communication among the three sections occurs through a common memory structure. The portion of the gateway 130 below the horizontal broken line in FIG. 5 is similar to the adapter card 70 of FIG. 4, except that there is no provision for an interface with a digital feature phone or with a PC. Thus, the application processing, ring interface and common memory sections correspond, respectively, to the node processing, ring interface and common memory sections of the adapter card 70 of FIG. 4.

The gateway 130 interfaces with the Tip and Ring conductors of as many as eight trunks 131 by means of trunk circuits 132, two of which are illustrated. Each of the trunk circuits 132 includes a trunk line interface 133 and a configuration register 134. The trunk line interfaces 133 are all coupled via a bus 135 to a serial/parallel converter 136 which is, in turn, coupled to a voice digital signal processor (DSP) 137. The voice DSP 137 is coupled to a local static RAM 138 and local ROM 139 by a bus 140, which is also coupled to the configuration registers 134 of each of the trunk circuits 132. The bus 140 is coupled via bus logic 141 to a call signaling processor 142 which is, in turn, coupled via bus logic 143 and a common bus 144 to common memory 145 and common memory interface logic and arbitration circuitry 145a. The common bus 144 is coupled via bus logic 146 to an application processor 147 which is, in turn, coupled to a watchdog timer and reset circuit 148. The watchdog timer and reset circuit 148 is coupled via a bus 149 to a non-volatile RAM 150, a local ROM 151 and a local RAM 152. The bus 149 is coupled by bus logic 146a and a portion of the bus logic 146 to the common bus 144. The bus 149 is also coupled to card status circuitry 153 and, via bus logic 154, to a ring interface 155 which is in turn, coupled by a connector 155a to node lines of an associated NCU 51 of the token ring network 50. The ring interface 155 is also coupled by bus logic 156 to common bus 144.

Each trunk line interface 133 provides the required termination and electrical conditioning for its associated two-wire pair trunk. Suitable protection circuits for Dower cross and lightning are provided, along with trunk status and supervision circuits. The trunk line interface 133 also operates to convert the real time analog voice on the trunk 131 to digitized signals using a MU-LAW PCM technique. The configuration registers 134 configure the trunk circuits 132 for the type of trunks to which it is coupled, viz., loop start or ground start.

The serial PCM voice signals are then passed along the bus 135 to the serial/parallel converter 136, which converts the serial digital voice data to a parallel format. The parallel digital voice information is then passed through the voice DSP 137 and is written into the local RAM 138 under the control of the call signaling processor 142, which may be an Intel 8186 microprocessor. The purpose of the voice DSP 137 is to manipulate the voice information in the digital domain and, in the preferred embodiment, is utilized to provide echo cancellation. It may also be used for "Touch Tone" detection, such as in telephone answering applications wherein prerecorded messages are responded to by "Touch Tone" signals.

It will be appreciated that the serial/parallel converter 136 is shared by all of the trunk circuits 132 on a time division multiplexed basis. It will also be appreciated that the serial/parallel converter 136 is bidirectional, so that it not only converts serial information from the trunk circuits 132 to parallel format, but also converts parallel format digital data from the local RAM 138 and converts it into serial form for delivery to the trunk circuits 132.

The local ROM 139 contains program codes for the call signaling processor 142, and conference call lookup table data. Preferably, each of the local RAM 138 and the local ROM 139 is in the form of a 64K×16 bits memory organized into ODD and EVEN bytes in accordance with the Intel 8186 microprocessor conventions. The bus logic 141 and 143 provides the address, data and control signals driver and receiver and transceiver buffer circuitry for the call signaling processor 142, which operates at 16 mhz and functions to control the transmission and reception of voice data to and from the trunks 131 and phone devices on the token ring network 50.

The application processor 147, which may also be an Intel 8186 microprocessor, serves as the intelligent controller for the gateway 130. It monitors traffic on the token ring network 50 through the ring interface 155 and monitors traffic on the trunks 131 through the call signaling processor 142, all via the common bus 144. The programs for controlling the application processor 147 are stored in local ROM 151. The local RAM 152 provides fast static storage for run time processing requirements for the application processor 147. The non-volatile RAM 150 permits real time software upgrades and other long term storage capabilities. Each of the memories 150, 151 and 152 is preferably a 64K×16 bit memory, organized into ODD and EVEN bytes in accordance with the Intel 8186 conventions. The bus logic 146 and 146a consists of the address, data and control signals driver and receiver and transmitter buffer circuitry for the application processor 147.

The watch dog timer and reset circuit 148 insures that the application processor 147 and, therefore, the gateway 130, are executing properly. A free running timer will reset the application processor 147 if a line thereto is not toggled within a predetermined time period. A power-on reset signal is provided to initialize the hardware during power loss and reapplication. A reset button (not shown) is also provided in the gateway 130 to restart the three processors 142, 147 and 155 to provide for user control during improper operation. The card status circuitry 153 includes a plurality of LEDs to indicate when the gateway 130 has power, when it is operational and able to communicate on the token ring network 50, when there is voice circuit activity, and when it has been inserted on the token ring network 50.

The common memory 145 is employed to facilitate the transfer of data and control information among the processing blocks. It includes static RAM devices. The common memory interface logic and arbitration circuitry 145a includes circuitry analogous to the common memory interface logic 83 and the arbitration functions of the ring/node logic 97 of the adapter card 70 of FIG. 4. The ring interface 155 is substantially the same as the ring interface 92 of FIG. 4, the address, data and control signals and buffer circuitry therefor being provided by the bus logic 156.

An additional exclusive communication path is provided between the application processor 147 and the ring interface 155, via the bus 149 and bus logic 153, so that the application processor 147 can directly configure the ring interface 155 and thereby reduce traffic on the common bus 144 that is not destined for all users. This additional path is utilized in the event of coupling of the gateway 130 to a direct inward dial (DID) trunk for mapping the DID registers into the bus 149 of the application processor 147, since the typical information gained through a DID cycle does not involve the call signaling processor 142.

Figure 6:
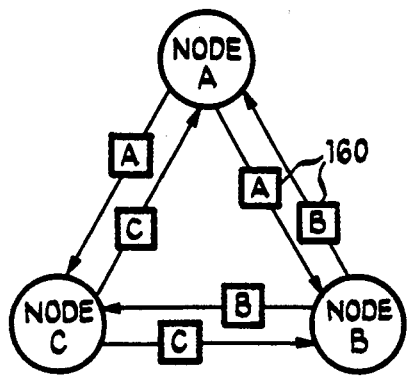
FIGS. 6 and 7 are functional diagrams of the packet format for the CONFERENCE call processing feature of the adapter card of FIG. 4.

One of the significant call processing functions is multi-party conferencing, i.e., a telephone call among more than two parties, wherein all parties can hear one another. Referring to FIG. 6, in a typical packet-switched network, a two-party call between two nodes A and B simply requires each node to send each of its voice packets to the other party. Thus, in a call between nodes A and B, node A sends its A voice packet 160 to node B and node B sends its B voice packet 160 to node A. As was explained above, the present invention is designed to have a standard voice packet size of 128 bytes of voice information. At the standard ISDN voice signaling rate of 8 Kbs, that means that a single node with one voice connection can send a voice packet every 16 ms. The chip sets utilized in the ring interface 92 of the adapter card 70 (and the ring interface 155 of the gateway 130) requires about 1.5 ms to transfer a packet. Since there is no more than one packet every 16 ms, there is plenty of time. But the gateway 130 is coupled to eight different trunks 131 and, therefore, is the equivalent of eight nodes, since it can accommodate eight simultaneous voice conversations. If all eight trunks were in a voice conversation simultaneously, the ring interface 155 would have to be sending a packet every 2 ms (16/8). Since it can handle a packet every 1.5 ms, there is still enough time.

But the situation is different in the case of a three-party conference. Referring again to FIG. 6 utilizing prior techniques in a three-party conference among nodes A, B and C, each party node must send each of its voice packets 160 to each of the other two parties to the conference. This means that if the gateway 130 had all eight trunks 131 engaged in three-party conferences, the ring interface 155 would have to send or receive 16 packets every 16 ms, which is one packet per ms, which is more than it can handle.

Furthermore, it can be seen from FIG. 6 that when the three-party conference is compared to the two-party call, while the number of the parties has increased by only fifty percent, the number of packets traversing the token ring network 50 has tripled. For a two-way call there are two packets every 16 ms, while for a three-way there are six packets every 16 ms. Thus, if there are multiple conferences occurring simultaneously on the token ring network 50, the ring can become bogged down with voice packets.

Figure 7:
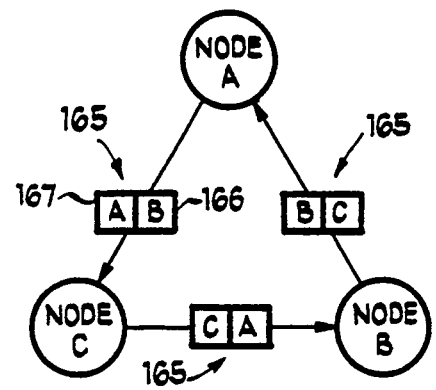

In order to alleviate this difficulty, the present invention has adopted the conferencing scheme illustrated in FIG. 7. In this technique, the voice packets are piggybacked so that each node, instead of sending two packets, respectively, to the other two party nodes, rather sends a double-length packet to one node. More specifically, each node sends a conference packet 165 which comprises two sequential sectors 166 and 167, each of which sectors has the standard 128-byte length, so that the overall packet 165 has a voice information length of 256 bytes. The first sector 166 is a remote sector which contains voice information from a node remote from that which is sending the packet 165, while the sector 167 is a local sector which contains voice information from the local node which is sending the packet. By way of example, node A sends a voice packet to node C. Node C copies the node A voice information from the packet, but then passes it on to node B in the remote sector 166 of new packet 165 after adding to it the node C voice information in a local sector 166. At node B both sectors of the received AC packet 165 are copied and then the C information is passed on to node A in the remote sector of a new packet, after having added to it the node B voice information in a local sector. Similarly, node A copies the entire received CB packet, strips off the C sector and passes on the B information after having added the node A voice information in a new BA packet 165. Each node receives the voice information of the other two nodes, but the number of packets on the ring has been halved.

There may be a slight delay, depending upon the location of the party nodes in the network, since, e.g., the node A information must pass through node C before it gets to node B, but this is not sufficient to impair the "real-time" quality of the voice reception. It is noted that this packet configuration can easily be handled by the ring interface 155 since, while that interface is limited in the number of packets per unit times it can handle, it is not significantly affected by the size of the packets. Thus, it does not take the ring interface 155 a significantly longer time to transmit a 256-byte packet 165 than it does a 128-byte packet 160.

In any conferencing arrangement, each node is essentially simultaneously receiving units of voice information from other nodes and those units must be summed before presentation to the local phone 58. The summing function is performed by the phone processor 100 of the adapter card 70 (FIG. 4). This processor is essentially continuously performing a summing function by adding together voice packet information. The processor 100 receives MU-LAW digital packets from the ring interface 92 via the common memory 80, converts the digital information to analog, sums it in the linear domain, and then converts it back to MU-LAW form for presentation to the "S" interface 103 for delivery to the digital phone 58. Essentially, the two sectors of the incoming conference packet 165 are stored in common memory 80 in two different locations under the control of the node processor 71, which then causes the phone processor 100 to take one byte at a time from each of these sector memory locations and sum it, divide by two, and give the result to the "S" interface 103. The phone processor 100 is continually performing this summing operation, even in the event of a normal two-party call. In the two-party case, each incoming packet is duplicated in both of the sector locations of common memory 80. The phone processor 100 then sums the bytes from both locations, which are identical, and then divides by two to arrive at the same byte, as if it had been directly received. In this way, the conferencing function does not have to be turned on and off.

Outgoing conference packets 165 are built in common memory 80 under control of the node processor 71. Thus, after an incoming packet 165 had the sectors thereof summed and presented to the "S" interface 103, the remote sector is recopied at another location in common memory 80 and is built into a new packet, to which is added a local sector containing the voice information from the local phone 58, and then the packet 165 is transmitted in the usual manner.

In the preferred embodiment of the invention, the system is limited to three-party conferencing by the nature of the microprocessor chip utilized in the phone processor 100, which is a low-powered processor having no math functions, for reasons of economy. However, it will be appreciated that the techniques of the present invention could readily be adapted for N-party conferencing by the use of a more powerful microprocessor chip with math functions in the phone processor 100. In an N-party conference, each packet 165 would have a local sector 167 preceded by a plurality of remote sectors 166. In each receiving node the first remote sector 166 would be stripped off and the remaining sectors would all become remote sectors and have added thereto a local sector including the voice information from the local node. However, it will be appreciated that with the token ring interface chip set being utilized in the present invention, the number of parties to a conference would be limited in that the length of the packet 165 could not become so long that the time required for the ring interface chip set to transfer it exceeds 2 ms.

Referring now to FIGS. 8-19, some of the basic call processing operations of the adapter card 70 and the gateway 130 will be described in greater detail in connection with the software implementation of those operations. The most basic call processing feature is the Userline feature of the adapter card 70 which allows the user to initiate, establish and maintain two-way calls from a phone device 58. Flow charts of the software functions implementing this feature are illustrated in FIGS. 8-9B.

Each phone processor 100 is controlled by a set of application layer "tasks" which are spawned during system initialization, viz., a Port Task, a Device Task and a Call Task. The Port Task is an event-driven task which receives all the control packets from other devices on the token ring network 50, and either routes these packets to another task or calls packet-type-specific handler functions to process the message.

The packet type and the state of the line associated with the incoming packet determine the Port Task's action. The Device Task is a state-driven task which receives all D-channel packets from the local phone processor 100 and receives some D-channel packets from the token ring network 50. During origination of a call, the Device Task functions directly to process all these messages, but once the Device Task relinquishes the control of the call to the Call Task, the Device Task only receives D-channel packets from the local phone 58, passing some of the packets to the Call Task, while directly processing others.

The Call Task is also a state-driven task which handles the protocol to complete a call, i.e., establish B-channel connections, and handles the protocol for most of the call processing features when in an active call. Even though the Call Task is spawned during application initialization, it only becomes active when the Device Task passes control of a call to it. The Call Task receives and processes D-channel packets from both the token ring network 50 and from the local phone device 58.

The phone 58 has a data base which contains line Data Base Blocks that correspond with each phone key that is allocated as a Userline. During initialization of the node adapter card 70, the data base is traversed, and each appearance of a Userline in the data base causes a user initialization function to be called which allocates a Line Control Block and copies the necessary data base information from each line Data Base Block, and adds the name of that line to the name table if it has not already been added. The system then generates a unique name for the line, which is a combination of the node address, port number and matrix ID for the phone key for which the line is assigned.

A basic call using the Userline feature is initiated by a user going off hook (handset activated), by hitting the speaker phone button, or by hitting a feature button programmed as a Userline. The actions which follow are dependent on whether the chosen line is idle or has an incoming call associated with it. Referring to FIG. 8, when an idle line is chosen, the Device Task returns dial tone to the user to prompt him to dial the destination node's number. The Device Task enters a call initiation state in which it awaits dial digits. The first digit is always checked to determine the type of call, i.e., internal, external or operator. In response to the keypad depression, a dual-tone multifrequency (DTMF) signal is returned to the local phone device 58. The system then analyzes the first digit to determine whether or not this is an external call, i.e., one to the destination device outside the token ring network 50. If it is not, the call task proceeds through the internal digit collection state and continues to collect the dial digits, with a DTMF signal being returned to the phone device 50 after each digit. When a predetermined number of digits has been detected a SETUP message is broadcast on the token ring network 50, this message including the source name of the local originating node and a non-unique logical name of the destination node, and the Device Task then enters the internal call delivered state.

In the internal call delivered state, the Device Task waits for the return of an ALERT packet from the expected destination node. The SETUP packet is examined by each node on the token ring network 50 to see if it contains a logical name for that node. If it does, then that node is the intended destination node and it returns an ALERT packet directly to the address of the originating node. The ALERT packet may be one of two types, viz., it may indicate that the destination node is busy, in which case a busy tone will be returned to the originating phone 58, or it may indicate that the destination node is idle, in which case a ring-back tone will be returned to the originating phone 58. If the dialed number does not exist on the network, after a predetermined time out a reorder tone, which is a fast busy tone, will be returned to the originating phone 58. If any type of busy tone is returned, the Device Task will enter the busy state, waiting for the caller to hang up, in which case, the task will return to the Idle state. If the caller hangs up before the return of an ALERT packet or time out, a DISCONNECT message is sent to the destination node and the originating node returns to the Idle state.

If the called number rings, control of the call is then passed to the Call Task and the Device Task enters an active call state, where it will remain until the caller hangs up, in which event the Call Task will be informed and the Device Task will return to the Idle state.

If the first digit of the dialed phone number indicates that it is an external call, the Device Task proceeds to the external digit collection state and proceeds to collect the digits in the same manner as in the case of an internal call, described above. In this case, however, there is no set number of digits, as in the case of an intercom call. Rather different numbers of digits may be used, depending upon the destination of the call. However, there is a maximum number of digits which could be used for any call. If that number of digits is reached, a SETUP packet is sent, with the name of the gateway 130 node and a default trunk therein. If a received digit is not the last possible digit, then the Call Task checks to see if an inter-digit time-out has taken place. If it has not, the digit collection process continues. If the time between digits exceeds the predetermined time-out period, it is presumed that the dialing is complete and the SETUP packet is sent, after which the Device Task enters the external Call Proceed state.

The SETUP packet is directed to a gateway 130 node on the token ring network 50 and, in particular, to a default trunk coupled to that node. Since the trunk may not be available, the SETUP packet is sent three times. Thus, the task first checks to see if this is the third time and, if not, it checks to see if a timer has timed out and, if not, the SETUP packet is resent. If the timer has timed out or if this is the third try, a fast busy tone is returned to the originating phone 58 and the Device Task enters the Busy state, and when the originating caller hangs up, an ON-HOOK message is received by the Device Task and it returns to an Idle state. Indeed, anytime that the originating caller hangs up during the external Call Proceed state, the Device Task will return to its Idle state. If the trunk is available the Device Task will receive a CALL PROCEED packet from the gateway 130 and then pass the call to the Call Task and enter an Active state. Upon receipt of an event from the Call Task, the Device Task will return to an Idle state.

Referring now to FIGS. 9A and 9B, the Call Task routines will be described for both the originating (FIG. 9A) and destination (FIG. 9B) nodes. Both nodes start in the Call Inactive state, which is the Idle state for the Call Task. Upon receiving an event from the Device Task, such as the handing over of the call control from the Device Task at the originating node or the sending of an ALERT packet at the destination node, the Call Task enters the Call Proceed state at both nodes. When the user at the destination node answers the call, a CONNECT message is sent to the originating node, which receives it and then returns a CONNECT ACKNOWLEDGE message to the destination node. Both nodes then enter a B-Channel Negotiate state. The destination node awaits the receipt of a BCH NEGOTIATE message and the originating node sends such a packet after the CONNECT ACKNOWLEDGE packet has been transmitted. The BCH NEGOTIATE packet contains information about the B-channel of the originating node which the remote node should use when sending B-channel (voice) packets. The destination node receives the BCH NEGOTIATE message and sends a BCH NEGOTIATE ACKNOWLEDGE packet to the originating node, containing information about the destination node B-channel which the originating node should know. If the originating node has additional B-channels to set up, it will send a further BCH NEGOTIATE packet. If not, it will enter a 2-Way state. When the destination node determines that there are no more B-channels it also enters the 2-Way state, during which voice communication can proceed between the two nodes, which will continue until one party terminates the call by hanging up. Whichever caller hangs up first sends a DISCONNECT packet to the other node and enters the Call Inactive state, and when the other node receives the DISCONNECT packet, it also enters the Call Inactive state. This Call Task procedure is the same for both internal and external calls.

Figure 10:
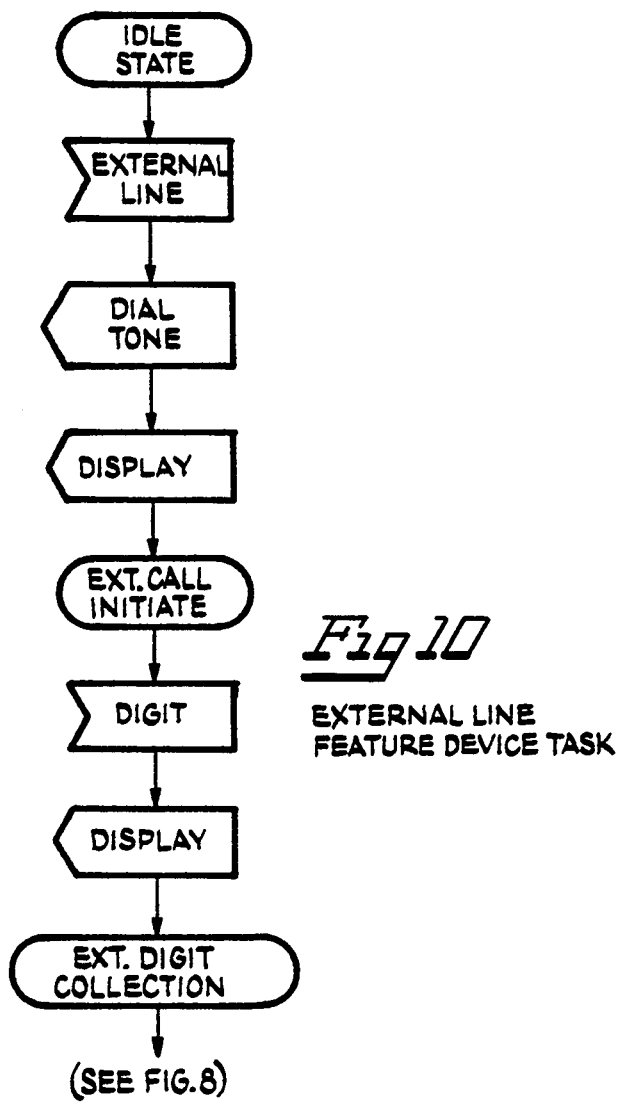
FIG. 10 is a flow chart of the Device Task and Call Task software for the EXTERNAL LINE call processing feature of the adapter card of FIG. 4.

An external call can be initiated by the use of the External Line feature as well as the Userline feature. Placing a call utilizing the External Line feature entails pressing one of the phone device buttons which are programmed as an External Line key. As indicated in FIG. 10, dial tone is immediately returned to the calling phone 58 by the Device Task and an LED display may also be activated. The Device Task then enters an External Call Initiate state in which it begins collecting the dialed digits, activating a display after each digit. After the first digit the Device Task enters the External Digit Collection state and will then proceed to process the call in substantially the same way as was described above for the Userline feature beginning with the External Digit Collection state in FIG. 8.

Figure 13:
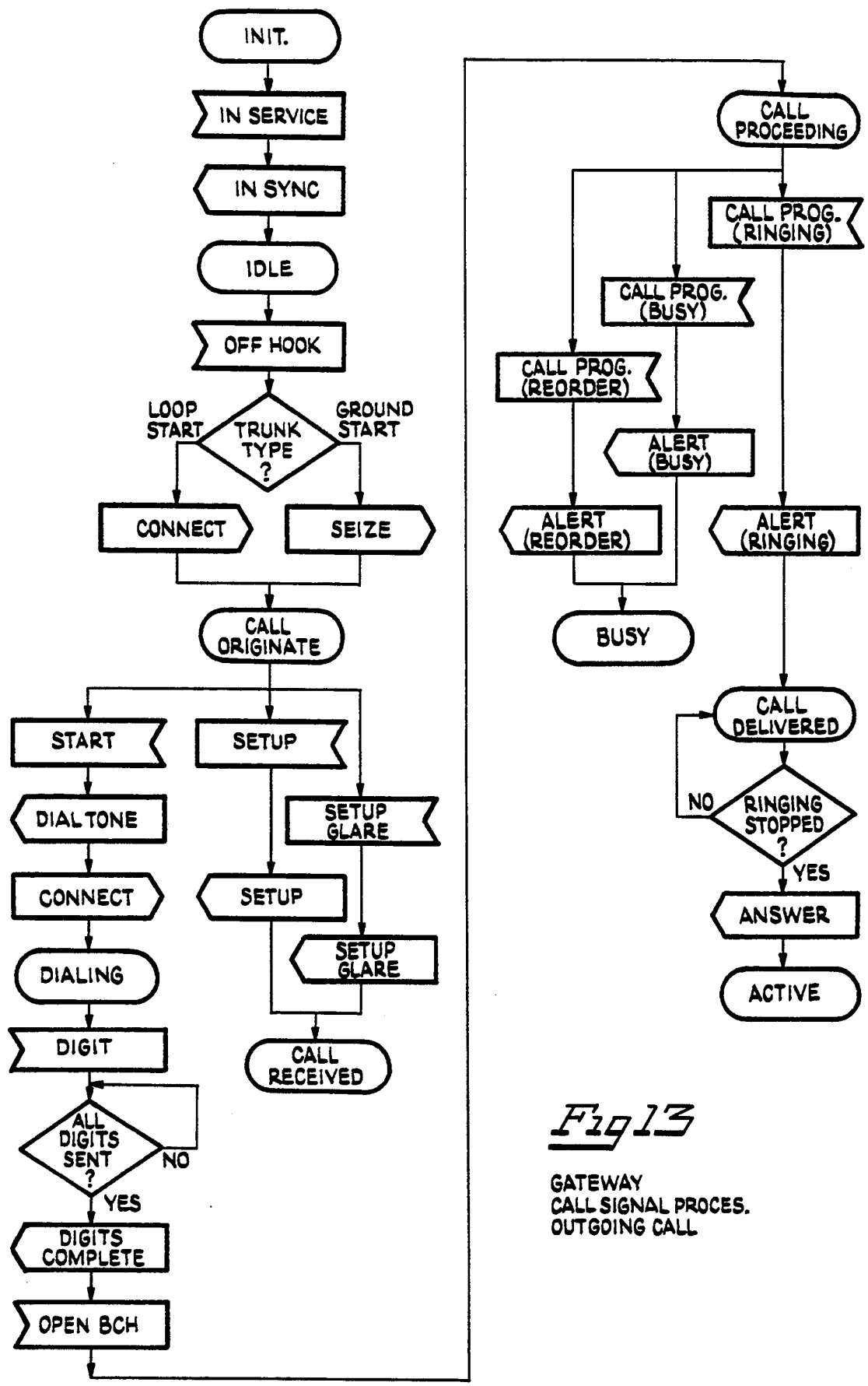
FIG. 13 is a flow chart of the call signaling processor of the gateway of FIG. 5 for an outgoing call.

Irrespective of how they are initiated, external calls must pass through the gateway 130. The software for controlling the gateway 130 during an outgoing external call is illustrated in FIGS. 11A-13, with FIGS. 11A-11D illustrating the Device Task of the application processor 147, FIGS. 12A-12C illustrating the Call Task of the application processor 147 and FIG. 13 illustrating the software for the call signaling processor 142. All three sets of flow diagrams must be read simultaneously. Upon initialization (power up), the Device Task sends to the call signaling processor 142 an IN-SERVICE message which contains the data base for the trunk, and the call signaling processor 142 returns an IN SYNC packet to the Device Task of the application processor 147 informing it that the INSERVICE message has been received and that the call signaling processor 142 is ready to begin call processing on the trunk. The Device Task and the call signaling processor 142 then both enter the Idle state. (See FIGS. 11A and 13).

An outgoing trunk call is initiated by a node requesting an outgoing trunk. As explained above, the originating node broadcasts a SETUP packet to the specific trunk desired. This packet is processed by the gateway 130 which added the trunk. If the trunk is not idle, the SETUP packet is ignored. This does not create a problem, since the SETUP broadcast will be repeated several times, as explained above until it encounters an idle trunk or until the originating node resigns. The Device Task then broadcasts STATUS or CONTROL STATUS packets to the originating phone advising that processing is about to begin on the trunk. If the trunk is idle, the Device Task attempts to seize the trunk by sending an OFF-HOOK message to the call signaling processor 142, which then checks to see whether the trunk is a loop start or a ground start type. In the case of a loop start it sends a CONNECT signal to the trunk, and in the case of a ground start it sends a SEIZE signal to the trunk, and then enters the Call Originate state, as does the Device Task of the application processor 147.

Three different events can cause a seizure attempt to fail. The first is a result of an incoming call, in which case the call signaling processor 142 receives a SETUP packet from the CO, and responds by sending a SETUP message to the Device Task of the application processor 147 and then both proceed to process the incoming call, as will be explained more fully below. The second event is the result of a glare incoming call (which only applies to two-way loop start trunks), i.e., simultaneous seizure by both local and remote parties. In this case the call signaling processor 142 receives a SETUP GLARE message from the CO, returns such a message to the Call Task of the application processor 147, and then again proceeds to process the incoming call, as does the Device Task of the application processor 147 after recording the glare condition. The third event is the receipt of an OUT OF SYNC message from the call signaling processor 142 (FIG. 5) of the gateway 130. In this event, an IN SERVICE message is sent to the call signaling processor 142 and the Device Task falls into the Sync Wait state to await the receipt of an IN SYNC message.

If the seizure request is successful, the call signaling processor 142 receives an appropriate START message from the trunk and sends a DIAL TONE message to the Device Task of the application processor 147 and a CONNECT message to the trunk and then enters the Dialing state. The Device Task of the application processor 147 returns a DIAL TONE message to the originating node and the caller then proceeds to dial the call and the Device Task passes the called number digits to the call signaling processor 142 for out pulsing on the trunk. The Device Task then sends a CALL PROCEED message to the originating node and enters a Call Proceeding state. After the digits have been out pulsed, the call signaling processor 142 sends a DIGITS COMPLETE message to the Device Task of the application processor 147, which returns an OPEN BCH message to the call signaling processor 142, causing it to enter the Call Proceeding state. The Device Task of the application processor 147 then sends a CONNECT packet to the originating node and transfers control of the call to the Call Task and then enters the Active state. In the event of a DISCONNECT message from the originating node, indicating that the caller has hung up, an ON-HOOK message is sent to the call signaling processor 142 and the Device Task enters the Disconnect state. The call signaling processor 142 will respond to the ON-HOOK message by disconnecting the trunk and returning an IDLE message to the Device Task of the application processor 147. Referring to FIG. 11C, when this IDLE message is received, the Device Task, after broadcasting STATUS or CONTROL STATUS (IDLE) messages to the trunks, will enter the Idle state.

Referring to FIG. 12A, when the Call Task of the application processor 147 receives the event from the Device Task, it starts a timer and enters a Call Delivered state, awaiting a CONNECT ACKNOWLEDGMENT message from the originating node. If the timer times out, an ON-HOOK message is sent to the call signaling processor 142, which responds as described above, and control of the call is then returned to the Device Task of the application processor 147, and the Call Task enters the Inactive state. Upon receipt of the event from the Call Task, the Device Task enters the Disconnect state (see FIGS. 11B and 11C). In the event that the originating caller hangs up after transfer of the control of the call to the Call Task, it sends a DISCONNECT message to the Call Task, which in turn sends an ON-HOOK message to the call signaling processor 142 and returns control of the call to the Device Task and enters the Inactive state with the results described above.

If the CONNECT ACKNOWLEDGE message is received before time-out, the Call Task enters the BCH Negotiation state and awaits a BCH NEGOTIATE message from the originating node. When it is received, the Call Task responds with a BCH NEGOTIATE ACKNOWLEDGE message to the originating node, opens the B-channel and enters the 2-Way state.

Meanwhile (FIG. 13), the call signaling processor 142, which is in the Call Proceeding state, awaits a response from the trunk. If it receives either a BUSY or REORDER message from the trunk, it sends the appropriate ALERT message to the Call Task of the application processor 147 and enters the Busy state. Referring to FIG. 12B, upon receipt of either message, the Call Task sends a DISCONNECT message to the originating phone, and then closes the B-channel and then returns control of the call to the Device Task and enters the Inactive state, while the Device Task enters the Disconnect state, as explained above in connection with FIGS. 11B and 11C. If a RINGING message is received from the trunk, the call signaling processor 142 returns the appropriate ALERT message to the Call Task of the application processor 147 and enters the Call Delivered State. When ringing has stopped, indicating that the destination node has gone OFF-HOOK, the call signaling processor 142 sends an ANSWER message to the Call Task of the application processor 147 and enters the Active state. Voice communication may now commence between the originating and destination nodes through the gateway 130.

Figure 14A:
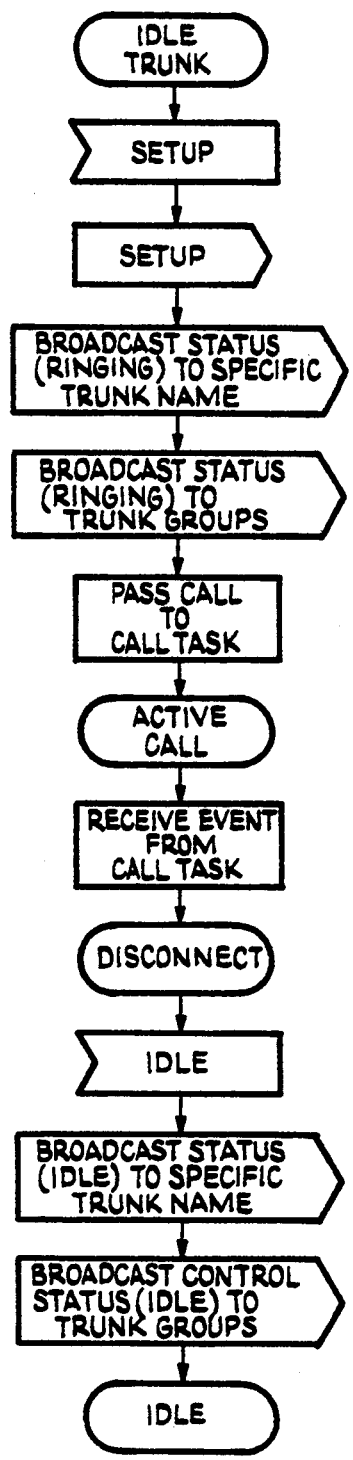
FIGS. 14A–14C are flow charts of the Call Task software of the application processor of the gateway of FIG. 5 for an incoming call.

The handling of an incoming call through the gateway 130 will now be described with reference to FIGS. 14A–15C, in which 14A illustrates the software for the Device Task, and FIGS. 14B and 14C the software for the Call Task of the application processor 147, while FIGS. 15A–15C illustrate the software for the call signaling processor 142. Referring to FIG. 15A, the call signaling processor 142 is assumed to be in the Idle state, after having received an INSERVICE message and sent an IN SYNC message, as described above. Upon receipt of a SETUP message from the trunk, the call signaling processor 142 sends a SETUP message to the Device Task of the application processor 147 which, in turn, sends a SETUP message to the destination node (FIG. 14A). At this point, the call signaling processor 142 enters the Call Received state, and the Device Task of the application processor 147, after broadcasting STATUS RINGING messages to specific trunk name or trunk group, passes control of the call to the Call Task.

Figure 14C:
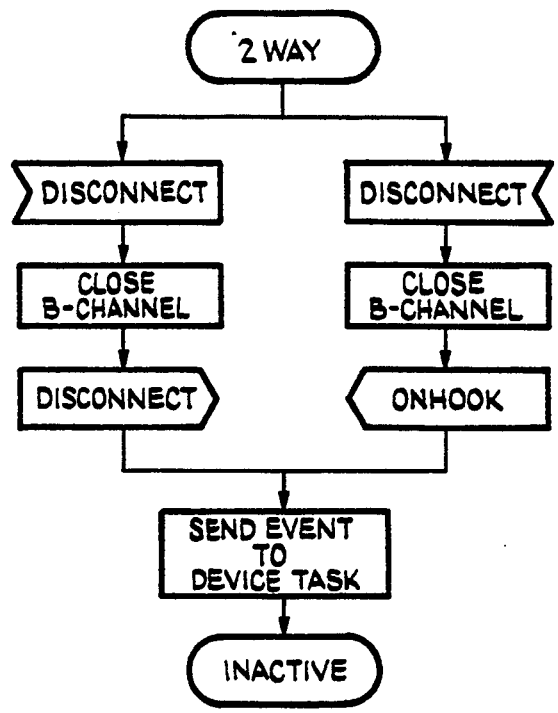
Figure 14B:
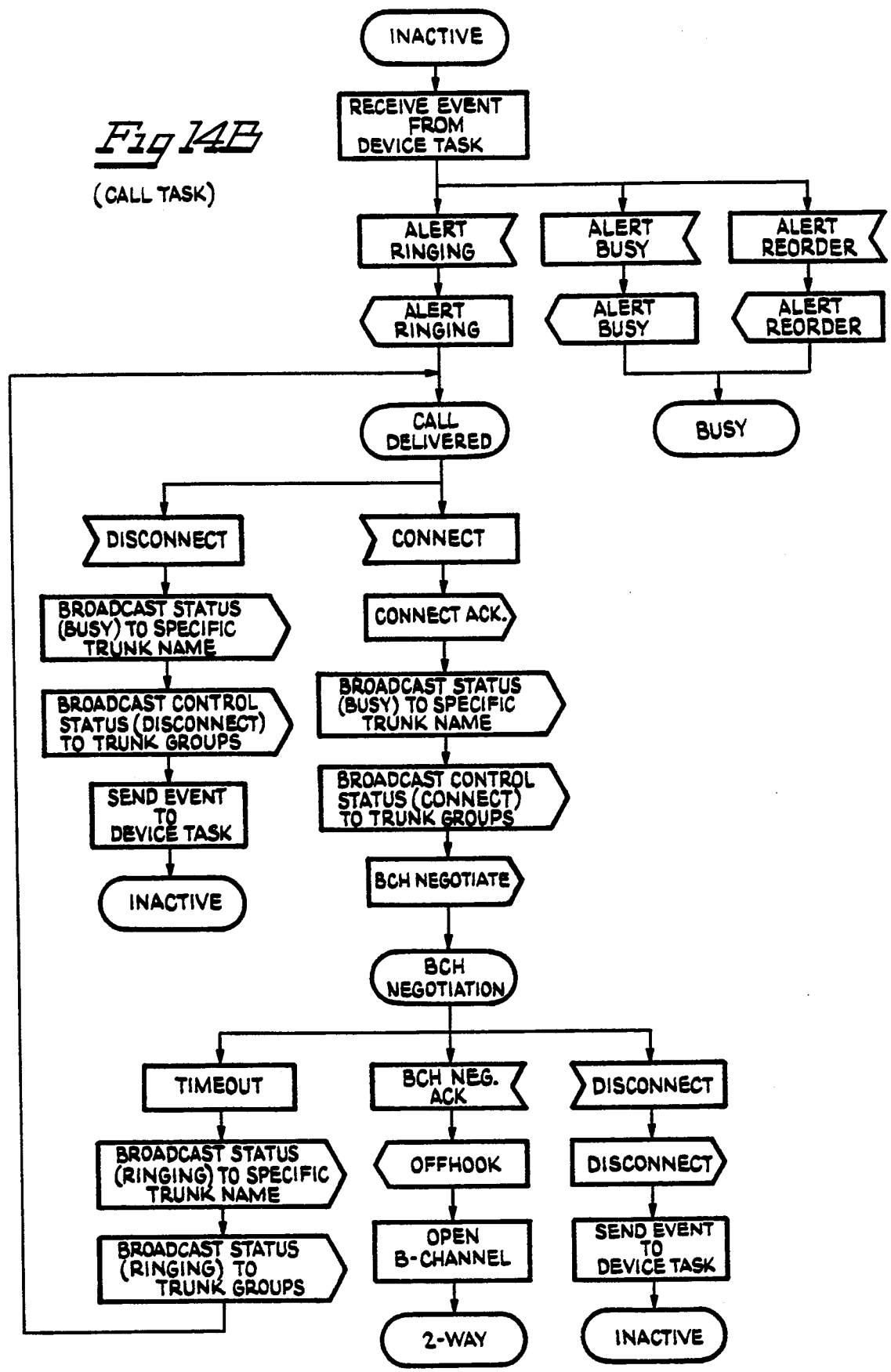

Referring to FIG. 14B, the Call Task then awaits an ALERT message from the destination node indicating its status. If it receives an ALERT BUSY or an ALERT REORDER message, it sends a corresponding message to the call signaling processor 142 and enters the Busy state. The call signaling processor 142 responds by sending corresponding messages to the trunk and then waits for a DISCONNECT message (FIG. 15A). If the Call Task of the application processor 147 receives an ALERT RINGING message from the destination node, it enters the Call Delivered state.

The Call Task now awaits receipt of a CONNECT message from the destination node, indicating that it has gone OFF-HOOK, and when it receives it, it sends a CONNECT ACKNOWLEDGE message to the destination node and broadcasts STATUS BUSY and CONTROL STATUS CONNECT messages to the trunk name and trunk groups, respectively, and then sends a BCH NEGOTIATE message to the destination node and enters the BCH Negotiation state. If, while in the Call Delivered state, the Call Task receives a DISCONNECT message from the call signaling processor 142, indicating that the incoming call has been disconnected, it broadcasts a STATUS BUSY and CONTROL STATUS DISCONNECT message to the trunk name and trunk groups, respectively, and then returns control of the call to the Device Task and enters the Inactive state. Referring to FIG. 14A, when the Device Task receives the event from the Call Task and enters the Disconnect state and then proceeds as was described above in connection with FIG. 11C.

The Call Task meanwhile awaits receipt of a BCH NEGOTIATE ACKNOWLEDGE message from the destination node. If a timer times out before such receipt, the Call Task again broadcasts STATUS RINGING messages to the trunk name and trunk groups and returns to the Call Delivered state. When the BCH NEGOTIATE ACKNOWLEDGE message is received, the Call Task sends an OFF-HOOK message to the call signaling processor 142, which responds by sending a CONNECT message to the trunk. The Call Task then opens a B-channel and sends an OPEN BCH message to the call signaling processor 142 which enters the Active state, while the Call Task of the application processor 147 enters the 2-Way state. Voice communication may now proceed between the two parties to the call.

If, while in the BCH Negotiation state, the Call Task of the application processor 147 receives a DISCONNECT message from the call signaling processor 142, it sends a DISCONNECT message to the destination node, returns control of the call to the Device Task and enters the Inactive state.

Referring to FIG. 14C, while the Call Task of the application processor 147 is in the 2-Way state, it receives a DISCONNECT message from either the destination node or from the call signaling processor 142, it closes the B-channel and sends a DISCONNECT message to the destination node or an ON-HOOK message to the call signaling processor 142, as the case may be, and then returns control of the call to the Device Task and enters the Inactive state.

Referring to FIG. 15B, if the call signaling processor 142 receives an IDLE message from the trunk or an ON-HOOK message from the application processor 147, it enters a Disconnect state and then sends an ON-HOOK message to the trunk and an IDLE message to the application processor 147, and then enters the Idle state. Referring to FIG. 15C, if the call signaling processor 142 receives an OUT OF SERVICE message from the application processor 147, it returns to the Initialized state.

Referring now to FIGS. 16–19, the setup of a conference call will be described. A conference starts with a two-way conversation between two parties. One party may then depress the conference feature key on his phone 58 and, at this time, he will become the conference Master, while the other party to the existing call, which is placed on hold, is referred to as the First Party. The Master is presented with a dial tone, with the line selected being associated with the conference button itself. The Master then initiates a call to a Second Party, which progresses normally until two-way conversation is achieved. The Master may then announce the conference and complete the conference by again depressing the conference button. When the conference button is depressed the second time, the First Party call which was on hold is drawn into the conference, i.e., both slave stations (First and Second Parties) are placed onto the single conference line associated with the second call.

Figure 16:
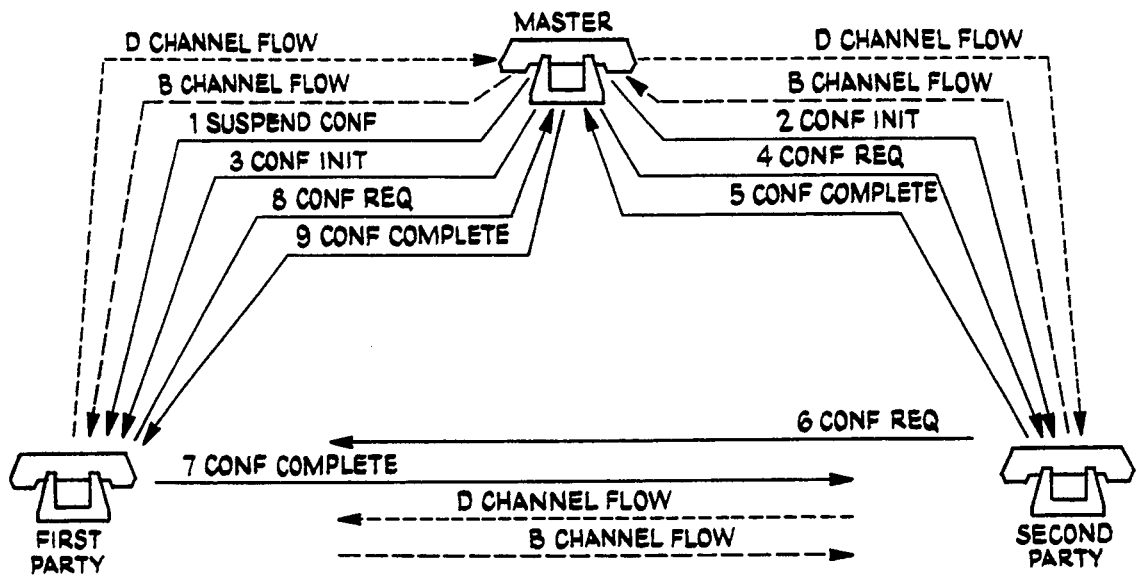
FIG. 16 is a functional flow diagram of a conference call establishment utilizing the system of FIG. 1.
Figure 17A:
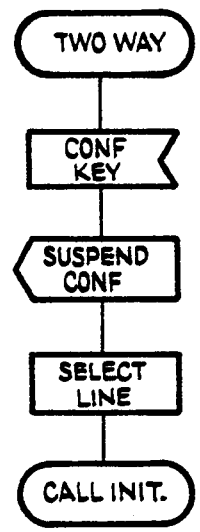
FIGS. 17A–17C are flow charts of the Master party states during setup of a conference call.
Figure 17B:
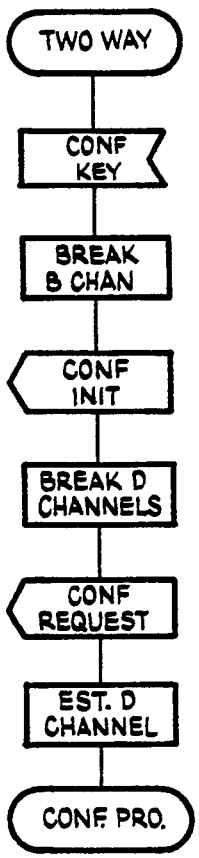
Figure 17C:
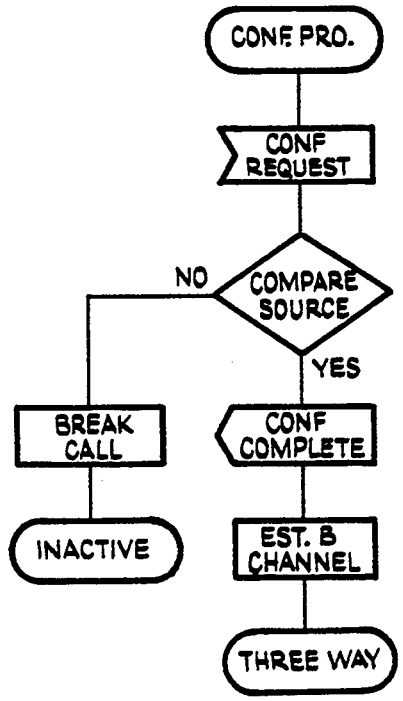
Figure 18:
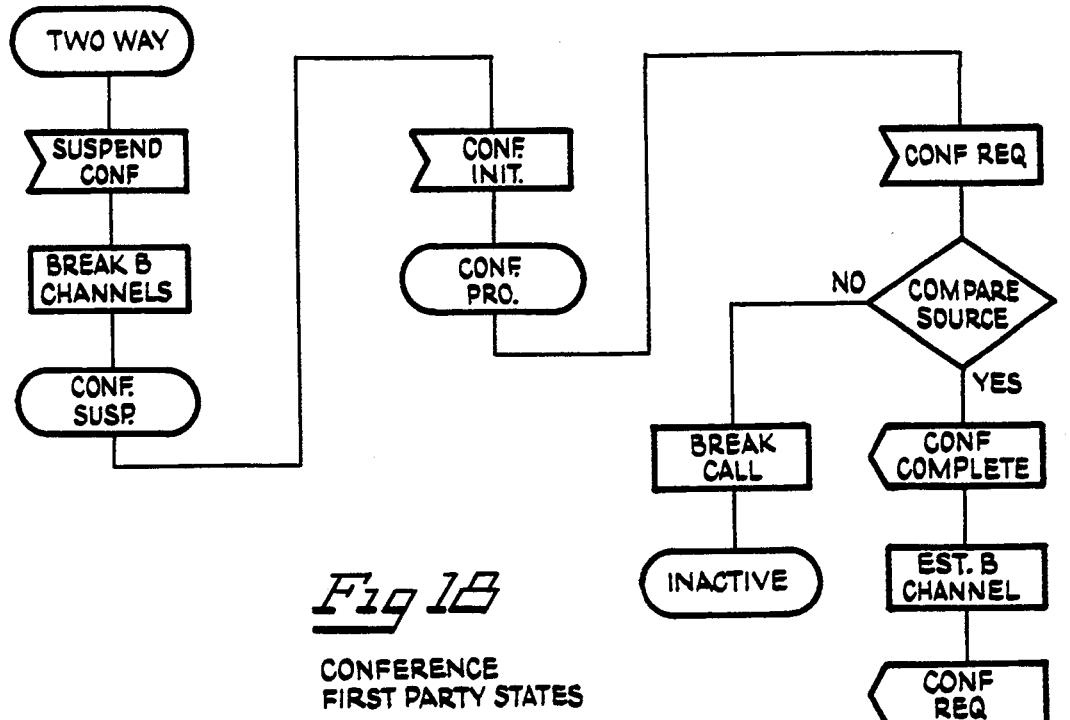
FIG. 18 is a flow chart of the First Party states during setup of a conference call.
Figure 19:
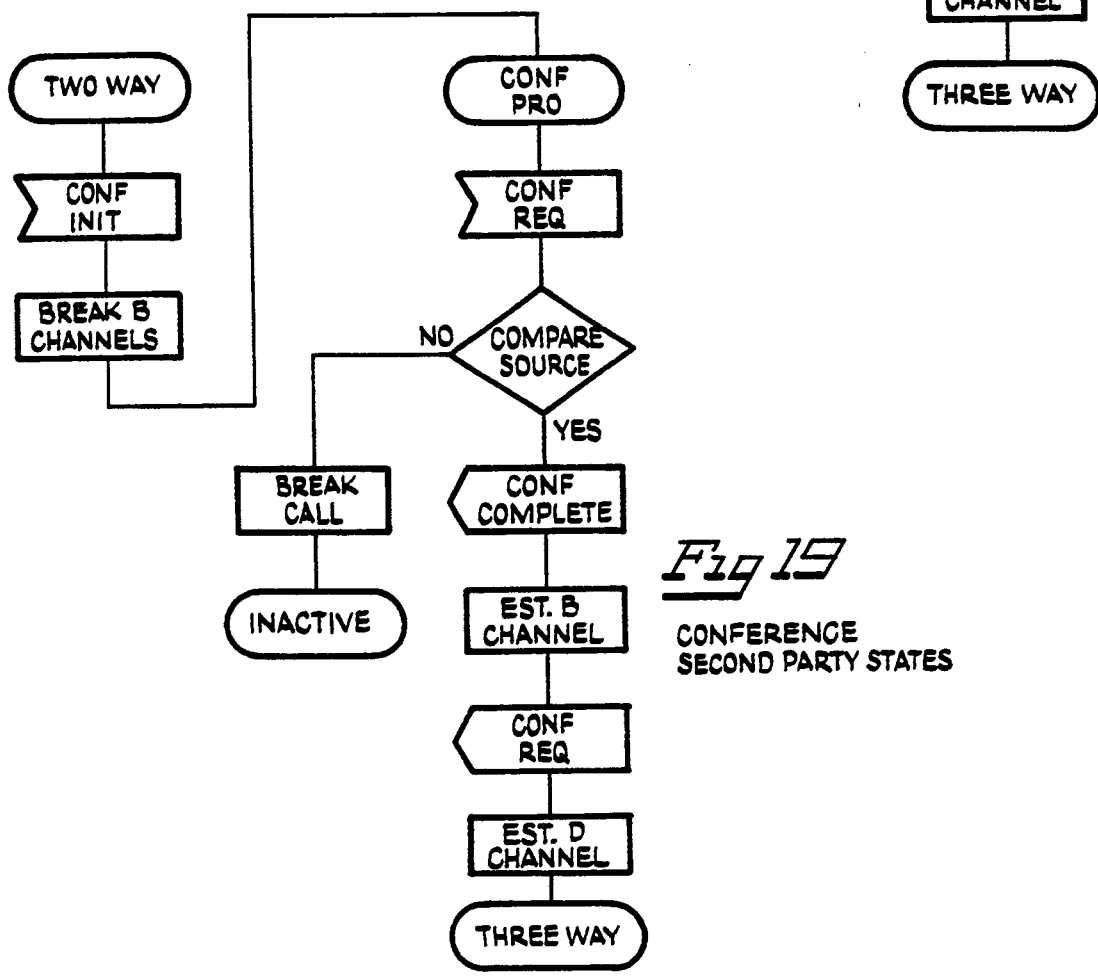
FIG. 19 is a flow chart of the Second Party states during setup of a conference call.

For purposes of the following discussion, FIG. 16 may be read in combination with FIGS. 17A–19. In this regard, FIG. 16 is a diagrammatic illustration of the packet flow during setup of a conference call, with the various messages indicated in solid line and numbered in accordance with the sequence of occurrence, and with B-channel and D-channel flows indicated in broken lines. FIGS. 17A–17C illustrate the various states at the Master, while FIG. 18 illustrates the states at the First Party and FIG. 19 illustrates the states at the Second Party.

While in two-way conversation with the First Party, the Master depresses the conference feature key and the adapter card 70 at the Master node receives a CONFERENCE KEY message from its local phone 58, and then sends a SUSPEND CONFERENCE packet to the First Party (FIG. 16, step 1) and selects a line for initiation of a call to the Second Party and enters the Call Initiation state (FIG. 17A). The First Party, upon receiving the SUSPEND CONFERENCE message, breaks its B-channels with the Master and enters a Conference Suspend state (FIG. 18). At this point, the First Party call is held by the Master.

The Master now places a call to the Second Party, which proceeds in a normal two-way manner described above, and enters two-way communication with the Second Party (FIGS. 17B and 19). The Master then again depresses the conference key, creating a CONFERENCE KEY message which is acknowledged by its adapter card 70, which then breaks the B-channels with the Second Party. The Master then sends CONF INIT messages to both the First and Second parties (steps 2 and 3, FIG. 16) and breaks the D-channels with the First and Second parties. Upon receipt of the CONF INIT message, the First Party enters the Conference Proceed state (FIG. 18), and the Second Party breaks the B-channels with the Master and then enters the Conference Proceed state (FIG. 19). The CONF INIT message to the Second Party contains information about the Master and the First Party, while the CONF INIT message to the First Party contains information about the Master in the Second Party. The First and Second Parties remain in the Conference Proceed state for a predetermined time period or until a CONF REQ message is received.

The Master next transmits a CONF REQ message to the Second Party (step 4, FIG. 16), establishes a D-channel with the Second Party and enters the Conference Proceed state (FIG. 17B). Upon receipt of the CONF REQ message, the Second Party compares the information in it with that in the CONF INIT message to see if it has been received from the proper party. If not, the Second Party breaks the call and enters an Inactive state (FIG. 19). If the CONF REQ message is from the proper party, the Second Party sends a CONF COMPLETE message to the Master (step 5, FIG. 16), and establishes a B-channel with the Master (FIG. 19). The Second Party then sends a CONF REQ message to the First Party (step 6, FIG. 16), opening a D-channel with the First Party, and then enters the 3-Way state. The First Party, upon receipt of the CONF REQ message, compares its source information with that in the CONF INIT message and, if it is not from the proper source, breaks the call and enters the Inactive state. If the CONF REQ message is from the proper source, the First Party sends a CONF COMPLETE message to the Second Party, establishing a B-channel with the Second Party (FIG. 16, step 7; FIG. 18). The First Party then sends a CONF REQ message to the Master (FIG. 16, step 8), establishing a D-channel with it, and then enters the 3-Way state. Upon receipt of the CONF REQ message, the Master checks its source information and, if it is improper, breaks the call and enters the Inactive state (FIG. 17C). If the CONF REQ message is proper, the Master sends a CONF COMPLETE message to the First Party (FIG. 16, step 9, FIG. 17C), and establishes a B-channel with the First Party and enters the 3-Way state. The conference is now fully established, and all parties can proceed with voice communication.

When a party in conference wishes to terminate, the two remaining parties must be able to continue a two-way conversation. Thus, if the First Party exits the conference by hanging up, upon receiving the ON-HOOK indication from the First Party phone 58, the First Party node adapter card 70 will send D-channel DISCONNECT message to the "downstream" neighbor in the conference, i.e., the Master in this case. The First Party then terminates and idles in the normal fashion. Upon receiving the DISCONNECT message from the First Party, the Master then breaks B-channels with that party, transmits a CONNECT message to the Second Party, and enters the B-channel Negotiate state. The Second Party receives the CONNECT message and enters the B-channel Negotiate state and the call is then set up as a normal two-way call. At this point, a conference may be reestablished with another party.

As indicated above, each digital phone 58 and each adapter card 70 is capable of controlling a number of other call processing features, but the control of these features will not be described in detail.

As indicated above, the present invention permits integration of imaging or video data as well as other data with the voice information on a token ring LAN. The operation of the system with video or other imaging information is not described in detail, but it will be substantially as described above in connection with data from a PC 57, with the adapter card 70 being connected to an imaging or video source instead of the PC 57. Furthermore, while the handling of voice calls has been described in detail, it will be appreciated that non-voice data communication can be conducted through the token ring network 50 and the gateways 130 in much the same manner, but under the control of existing, commercially available data LAN software.

While the present invention has been described in connection with a system having a token ring network protocol which complies with the IEEE 802.5 token ring standard specification, it will be appreciated that the principles of the present invention could be implemented on networks having similar properties and operating in accordance with similar protocols, such as the Fiber Distributed Data Interface (FDDI) specification, which operates at 100 Mbs on fiber optic cable, and could be run on copper wire. Furthermore, while the telephone 58 is preferable a digital feature phone, it will be appreciated that many of the features of the present invention are applicable for use with other types of telephones, in which case an appropriate interface would be substituted for the "S" interface 103 of FIG. 4.

From the foregoing, it can be seen that there has been provided an improved LAN which effectively integrates voice and data in a token ring network while insuring real-time voice communication and providing efficient three-way conference communication, with all processing functions being fully distributed among the stations on the network without the use of any central data base or switching facility.

We claim:

1. A communication system having a plurality of terminals not exceeding a maximum number of terminals including real-time information terminals interconnected in a token passing network for transmission of digital data including digitized real-time information signals along the network in the form of packets of bits with each packet including a number of bits, wherein each terminal gains access to the network by seizing a free token, said system comprising:

encoder means at each real-time information terminal for digitizing real-time information signals into bits, decoder means at each real-time information terminal for regenerating real-time information signals from received packets, buffer means at each real-time information terminal coupled to said encoder means for collecting a group of digitized real-time information bits such that a bit in the collected group which is first to enter the buffer means resides therein for a predetermined storage time period which is equal to or greater than a minimum value, packetizing means at each real-time information terminal coupled to said buffer means for assembling each collected group of stored digitized real-time information bits generating by said encoder means along with control bits into a real-time information packet having a predetermined first maximum length such that the terminal assembling the packet can seize a free token in a time period less than the minimum value of the predetermined storage time period, transmitting means at each real-time information terminal for transmitting packets to other terminals along the network, and receiver means at each real-time information terminal for receiving packets from other terminals along the network.

2. The system of claim 1, wherein the first maximum length is a function of the inverse of the maximum number of terminals in the network.

3. The system of claim 1, wherein selected real-time information terminals support one or more real-time information sessions, and the maximum number of real-time information sessions supported by any one terminal is N, where N is a positive integer.

4. The system of claim 3, wherein the maximum number of real-time information sessions on the network is a function of said maximum number of terminals in the network and the minimum value of the predetermined storage time period.

5. The system of claim 3, wherein each packet and each token has a priority level which is one of plural priority levels, with packets containing real-time information having a higher priority level than packets containing non-real-time information, each terminal gaining access to the network by seizing a free token that has a priority level equal to or less than that of a packet which is to be transmitted by that terminals such that high priority level packets have access to transmission on the network before lower priority packets, said packetizing means including means for limiting each real-time information packet to the first maximum length such that the minimum value of the predetermined storage time period is greater than the maximum time it takes to receive a token having the same priority level as a real-time information packet that is to be transmitted.

6. The system of claim 5, wherein the maximum time it takes to receive a free token having the same priority level as a real-time information packet to be transmitted is a function of the inverse of N.

7. The system of claim 5, wherein the time it takes to receive a free token having the same priority level as a real-time information packet to be transmitted has a mean value which is a function of the inverse of N.

8. The system of claim 3, wherein said packetizing means includes means for forming packets such that all real-time information packets have the same number of digitized real-time information bits for any one session.

9. The system of claim 3, wherein the maximum time it takes to seize a free token is a function of the inverse of N.

10. The system of claim 3, wherein N is a function of the number of terminals in the network and the minimum value of the predetermined storage time period.

11. The system of claim 3, wherein the time it takes to seize a free token has a mean value which is a function of the inverse of N.

12. The system of claim 1, wherein non-real-time information packets having a second maximum length.

13. The system of claim 1, further comprising echo cancellation means coupled to said encoder means and to said decoder means at selected real-time information terminals for eliminating echoes resulting from system delays or acoustic feedback.

14. The system of claim 1, wherein the first maximum length is a function of the number of terminals in the network and the predetermined storage time periods in said buffer means.

15. The system of claim 1, wherein at least one of said real-time information terminals is a voice terminal coupled to a plurality of associated real-time application devices, each of which is a telephone.

16. A communication system having a plurality of real-time information terminals coupled to associated real-time application devices and interconnected in a network for controlling real-time information calls among real-time information terminals, wherein a call is a telecommunication connection among terminals for exchanging digitized real-time information and call control is fully distributed among the terminals, such that each of the terminals performs all call control functions associated with a coupled real-time application device, so that control of a call among terminals on the network is effected solely by terminals which are party to the call and is not effected by a centralized call control apparatus or a centalized data base, each of said real-time information terminals having associated therewith a local data base containing the local physical address associated with the terminal and a local logical name associated with a coupled real-time application device, said system comprising:

storage means at each of the terminals for storing the local data base, formatting means at each of the terminals coupled to said storage means and receiving data from the local data base for forming formatted control messages for controlling of calls, each formatted control message including a source address field containing the physical address of the terminal transmitting the message and a destination address field containing the physical address of a specific terminal to which the message is directed or a broadcast address if the message is directed to a plurality of terminals and information fields which contain a logical means and/or control information, transmitting means at each of the terminals coupled to said formatting means for transmitting messages to other terminals on the network, receiving means at each of the terminals for receiving from the network all messages addressed to the terminal including broadcast messages, broadcast means at each of the terminals coupled to said transmitting means and to said formatting means for broadcasting to a plurality of terminals on the network a control message containing a non-local logical name, recognition means at each of the terminals coupled to said storage means and to said receiving means thereat and operative if a broadcast control message includes a logical name in its information field matching a logical name in the local data base stored in said storage means for accepting of the message, D-channel means at each of the terminals coupled to said recognition means and to said receiving means for extracting the source address field of an accepted or received control message and for saving the address for use in the destination field of a non-broadcast control message to the terminals which sent the accepted or received control message, call controlling means at each of the terminals coupled to said broadcast means and operative if a coupled device wants to establish a connection to a logical name associated with a device at another terminal for transmitting digitized real-time information, said call controlling means being coupled to said D-channel means and to said transmitting means for transmitting a non-broadcast control message and being operative during the control of a call, said call controlling means being coupled to said receiving means and to said recognition means and being responsive to accepted and other received control messages and to a condition of a coupled real-time application device for controlling establishment and switching and termination of calls to which the terminal is a party without use of a centralized call control apparatus or a centralized data base, and B-channel means at each of the terminals coupled to said call controlling means and to said D-channel means and to said transmitting means and to the coupled device for transmitting digitized real-time information messages from the coupled device to another terminal which is party to the call and operative until said call controlling means terminates the call.

17. The system of claim 16, wherein the network is a token ring network and each message is a packet of bits.

18. The system of claim 16, wherein selected real-time information terminals have at least one non-unique logical name associated therewith.

19. The system of claim 18, wherein at least one of said real-time information terminals is a voice terminal coupled to a plurality of associated real-time application devices, each of which is a telephone.

20. The system of claim 19, wherein each telephone has associated therewith at least one unique logical name which incorporates the address of the terminal to which it is coupled.

21. The system of claim 16, wherein the network is a local area network, and further comprising gateway means coupled to the local area network and to one or more trunks each having associated therewith a trunk name for providing communication between the local area network and external wide area network systems, said gateway means including echo cancellation means for eliminating echoes caused by system delays.

22. The system of claim 16, wherein said call processing means includes means for establishing conference communication among more than two real-time information terminals.

23. In a communication system having a plurality of real-time information terminals interconnected in a packet switched local area network with the terminals respectively coupled to associated real-time application devices for transmission of digital real-time information signals along the network in the form of packets of bits, wherein each packet includes a source address field containing a physical address of the terminal transmitting the packet and a destination address field containing a physical address of a specific terminal to which the packet is directed or a broadcast address if the packet is directed to plural terminals and an information field which contains a logical name of a terminal if the packet is a control packet or contains digitized real-time information if the packet is a real-time information packet, an improvement for providing conference communication among more than two real-time information terminals on the network, said improvement comprising:

means for establishing a conference communication link among terminals which are to be parties to a conference, transmitter means at each terminal for transmitting packets to other terminals on the network, receiver means at each terminal for receiving packets from other terminals on the network, packetizing means at each terminal operable if the terminal is party to a conference for forming a conference packet having an information field which includes a plurality of sequential sectors respectively containing real-time information from the terminal forming the conference packet and from one or more other terminals which are party to the conference, and processing means at each terminal coupled to said receiver means of the terminal for accepting conference packets addressed to the terminal and received from another party terminal, each of said packetizing means including means coupled to said receiver means and said transmitter means of its associated terminal for forming a new conference packet from a received conference packet by adding to the received conference packet a destination address of a new destination party terminal to which the new conference packet is to be sent and deleting from the received conference packet the sector containing real-time information from the new destination party terminal and adding to the received conference packet a sector containing real-time information from the terminal forming the new conference packet, said packetizing means transferring the new conference packet to said transmitter means of the associated terminal for transmitting the new conference packet to the new destination party terminal.

24. The system of claim 23, wherein said means for establishing a conference communication link includes means for establishing a link among three terminals.

25. The system of claim 23, and further comprising means for coupling the local area network to other voice terminal networks, said means for establishing a conference communication link including means for establishing a link among one or more terminals on the local area network and one or more terminals on another coupled network, said means for coupling including echo cancellation means for eliminating echoes caused by system delays.

26. The system of claim 23, wherein each real-time information terminal includes said means for establishing a conference communication link so that a conference communication can be set up from any real-time information terminal.

27. The system of claim 23, wherein said real-time application devices include telephone and the real-time information signals include voice signals.

28. For a communication system having a plurality of terminals not exceeding a maximum number of terminals including real-time information terminals interconnected in a token passing network for transmission of digital data including digitized real-time information signals along the network in the form of packets of bits with each packet including a number of bits, wherein each terminal gains access to the network by seizing a free token, a method of providing a real-time communication among terminals on the network, comprising:

digitizing real-time information signals into bits at each real-time information terminal, regenerating real-time information signals from received packets at each terminal, collecting at each real-time information terminal a group of digitized real-time information bits and storing a first bit of the collected group of digitized real-time information bits for a predetermined storage time period which is equal to or greater than a minimum value, assembling at each real-time information terminal each collected group of stored digitized real-time information bits generated thereat along with control bits into a real-time information packet having a predetermined first maximum length such that the terminal assembling the packet can seize a free token in a time period less than the minimum value of the predetermined storage time period, transmitting packets from each real-time information terminal to other terminals along the network, and receiving at each real-time information terminal packets from other terminals along the network.

29. The method of claim 28, wherein the first maximum length is a function of the inverse of the maximum number of terminals in the network.

30. The method of claim 28, wherein selected real-time information terminals support one or more real-time information sessions, and the maximum number of real-time information sessions supported by any one terminal is N where N is a positive integer, the maximum time it takes to receive a token having the same priority level as a packet to be transmitted being inversely proportional to N.

31. The method of claim 28, wherein non-real-time information packets have a second maximum length.

32. The method of claim 28, and further comprising cancelling at selected real-time information terminals echoes resulting from system delays or acoustic feedback.

33. For a communication system having a plurality of real-time information terminals coupled to associated real-time application devices and interconnected in a network for controlling real-time information calls among real-time information terminals, wherein a call is a telecommunication connection among terminals for exchanging digitized real-time information and call control is fully distributed among the terminals, such that each of the terminals performs all control functions associated with a coupled real-time application device, so that control of a call among terminals on the network is effected solely by terminals which are a party to the call and is not effected by a centralized call control apparatus or a centalized data base, each of the real-time information terminals having associated therewith a local data base containing the physical address associated with the terminal and a local logical name associated with a coupled real-time application device, a method of distributing call control among the terminals comprising:

storing at each of the terminals the local data base, receiving at each of the terminals data from the local data base for forming formatted control message for controlling of calls, each formatted control message including a source address field containing the physical address of the terminal transmitting the message and a destination address field containing the physical address of a specific terminal to which the message is directed or a broadcast address if the message is directed to a plurality of terminals and information fields which contain a logical name and/or control information, broadcasting from each of the terminals to a plurality of other terminals on the network, a control message containing a non-local logical name, transmitting messages from each of the terminals to other terminals and receiving at each of the terminals all messages from the network addressed to the terminal including broadcast messages, accepting at each of the terminals a broadcast control message which includes a logical name in its information field matching a logical name in the local data base, extracting at each of the terminals the source address field of an accepted or received control message and saving the address for use in the destination field of a non-broadcast control message to the terminal which sent the accepted or received control message, controlling at each of the terminals establishment and switching and termination of calls to which the terminal is a party solely in response to accepted and other received control messages and to a condition of a coupled real-time application device, and transmitting at each of the terminals digitized real-time information messages from the coupled device to another terminal which is party to the call until the call is terminated.

34. The method of claim 33, wherein selected real-time information terminals have at least one non-unique logical name associated therewith.

35. The method of claim 34, and further comprising coupling at least one of the real-time information terminals to a plurality of associated telephone devices.

36. The method of claim 35, wherein each of the telephone devices as associated therewith at least one unique logical name which incorporates the address of the terminal to which it is coupled.

37. The method of claim 33, wherein the network is a local are network, and further comprising providing one or more trunks each having associated therewith a trunk name for communication between the local area network and external wide area network systems, and cancelling echoes at an interface between the local area network and a trunk.

38. For a communication system having a plurality of real-time information terminals interconnected in a packet switched local area network with the terminals respectively coupled to associated real-time application devices for transmission of digital real-time information signals along the network in the form of packets of bits, wherein each packet includes a source address field containing a physical address of the terminal transmitting the packet and a destination address field containing a physical address of a specific terminal to which the packet is directed or a broadcast address if the packet is directed to a plurality of terminals and an information field which contains a logical name of a terminal if the packet is a control packet or contains digitized real-time information if the packet is a real-time information packet, a method of providing conference communication among more than two real-time information terminals on the network comprising:

establishing a conference communication link among terminals which are to be parties to a conference;

transmitting packets from each terminal to other terminals on the network;

receiving packets at each terminal from other terminals on the network;

forming, at a terminal which is party to a conference, a conference packet having an information field which includes a plurality of sequential sectors respectively containing real-time information from the terminal forming the conference packet and from one or more other terminals which are party to the conference;

accepting at each party terminal conference packets addressed to the party terminal and received from another party terminal;

forming at each party terminal a new conference packet from a received conference packet by adding to the received conference packet a destination address of a new destination party terminal to which the new conference packet is to be sent and deleting from the received conference packet the sector containing real-time information from the new destination party terminal and adding to the received conference packet a sector containing real-time information from the terminal forming the new conference packet; and transmitting the new conference packet to the new destination party terminal.

39. The method of claim 38, and further comprising coupling the local area network to other voice terminal networks, establishing a link among one or more terminals on the local area network and one or more terminals on another coupled network, and cancelling echoes at the interference between the local area network and another voice terminal network.

40. The method of claim 38, wherein the conference communication can be set up from any real-time information terminal.

* * * * *

UNITED STATES PATENT AND TRADEMARK OFFICE
CERTIFICATE OF CORRECTION

PATENT NO. : 5,341,374
DATED : August 23, 1994
INVENTOR(S) : Ronald C. Lewen, et al.

It is certified that error appears in the above-indentified patent and that said Letters Patent is hereby corrected as shown below:

Column 29, line 66, "generating" should be --generated--.

Column 30, line 32, "terminals" should be --terminal--.

Column 30, line 63, "having" should be --have--.

Column 31, line 41, "means" should be --name--.

Column 31, line 66, "terminals" should be --terminal--.

Column 33, line 57, "telephone" should be --telephones--.

Column 34, line 62, "message" should be --messages--.

Column 35, line 43, "are" should be --area--.

Column 36, line 48, "interference" should be --interface--.

Signed and Sealed this

Nineteenth Day of September, 1995

Attest:

BRUCE LEHMAN

Attesting Officer     Commissioner of Patents and Trademarks